US009782895B2

(12) United States Patent
Kanada et al.

(10) Patent No.: US 9,782,895 B2
(45) Date of Patent: Oct. 10, 2017

(54) APPARATUS FOR OPERATING ROBOTS

(71) Applicant: DENSO WAVE INCORPORATED, Chita-gun, Aichi-pref. (JP)

(72) Inventors: Motoki Kanada, Toyohashi (JP); Atsuko Sugano, Kariya (JP); Hirota Touma, Obu (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 15/075,916

(22) Filed: Mar. 21, 2016

(65) Prior Publication Data

US 2017/0021496 A1    Jan. 26, 2017

(30) Foreign Application Priority Data

Mar. 19, 2015   (JP) .................................. 2015-056506
Feb. 2, 2016    (JP) .................................. 2016-018004

(51) Int. Cl.
*G05B 19/04*  (2006.01)
*G05B 19/18*  (2006.01)
*B25J 9/16*   (2006.01)

(52) U.S. Cl.
CPC ..... *B25J 9/161* (2013.01); *G05B 2219/36168* (2013.01); *G05B 2219/39446* (2013.01)

(58) Field of Classification Search
CPC ........... B25J 9/161; G05B 2219/39446; G05B 2219/36168; G05B 2219/39448; G05B 2219/39449
USPC ................................................. 700/245, 257
See application file for complete search history.

(56) References Cited

U.S. PATENT DOCUMENTS

| | | | | |
|---|---|---|---|---|
| 5,937,143 A * | 8/1999 | Watanabe | .............. | B25J 9/1671 700/264 |
| 6,088,628 A * | 7/2000 | Watanabe | .............. | B25J 9/1656 700/251 |
| 6,167,328 A * | 12/2000 | Takaoka | ................ | B25J 9/1671 318/568.1 |
| 8,406,923 B2 * | 3/2013 | Ueyama | ................ | B25J 9/1697 700/245 |
| 8,972,055 B1 * | 3/2015 | Desai | .................... | B25J 9/1651 318/568.18 |
| 9,186,792 B2 * | 11/2015 | Kuwahara | .............. | B25J 9/1671 |
| 9,311,608 B2 * | 4/2016 | Kuwahara | .............. | B25J 9/1684 |

(Continued)

FOREIGN PATENT DOCUMENTS

JP      2006-142480 A    6/2006

*Primary Examiner* — Jaime Figueroa
(74) *Attorney, Agent, or Firm* — Oliff PLC

(57) ABSTRACT

A pendant provided with a touch panel is provided as a robot operating apparatus. Using the pendant, an operating position of, for example, an operator's touch operation on the touch panel is detected. In the pendant, by calculation responding to the touch operation, a coordinate system having axes is set on the touch panel in response to the touch operation, in which the axes are associated with the axes of a robot. A determination area is also set on the touch panel in the periphery of a start position of the touch operation. The determination area has a predetermined size. In the pendant, an axis being operated of the robot is selected based on an arrival position of the touch operation in the determination area. An operating area on the touch panel is set with the arrival position as the center of the determination area, ensuring a highly-reliable touch operation.

20 Claims, 20 Drawing Sheets

(56) References Cited

U.S. PATENT DOCUMENTS

| | | | |
|---|---|---|---|
| 9,387,589 B2* | 7/2016 | Barajas | B25J 9/1697 |
| 9,387,590 B2* | 7/2016 | Som | B25J 13/06 |
| 9,563,195 B2* | 2/2017 | Moriya | G05B 19/4069 |
| 9,625,899 B2* | 4/2017 | Kuwahara | G05B 19/425 |
| 2009/0289591 A1* | 11/2009 | Kassow | B25J 19/0004 318/568.13 |
| 2010/0103106 A1* | 4/2010 | Chui | G06F 3/017 345/166 |
| 2013/0009896 A1* | 1/2013 | Zaliva | G06F 3/0416 345/173 |
| 2014/0236565 A1* | 8/2014 | Kuwahara | B25J 9/1671 703/22 |
| 2014/0354548 A1* | 12/2014 | Lee | G06F 3/0346 345/166 |
| 2015/0081097 A1* | 3/2015 | Som | B25J 9/1656 700/257 |
| 2016/0096275 A1* | 4/2016 | Miyakoshi | B25J 13/06 700/264 |

* cited by examiner

APPARATUS FOR OPERATING ROBOTS

CROSS-REFERENCE TO RELATED APPLICATION

This application is based on and claims the benefit of priority from earlier Japanese Patent Application No. 2016-018004 filed Feb. 2, 2016, the description of which is incorporated herein by reference.

BACKGROUND

Technical Field

The present invention relates to an apparatus for operating a robot by an operation terminal equipped with a touch panel, and in particular, to the apparatus which is used to operate various types of robots which are categorized as industrial robots.

Related Art

In an industrial robot system, it is usually possible to manually operate the robot (which is called as manual manipulation). This manual manipulation is used, for example, in performing teaching work (simply teaching) which teaches a robot movement trajectories. In this case, it is usual that an operator uses a pendant (an robot manipulating apparatus, that is, a teaching pendant) controllably connected to a controller which controls the robot. Hence, the operator can manually manipulate the robot. With this purpose, the pendant is provided with various operation keys dedicated to the manipulation, which are configured as mechanical switches, for example (for example, refer to PTL1).

In recent years, a pendant with a touch panel has been provided, with which the foregoing manual manipulation can be performed by manual operations on the touch panel (hereinafter, referred to as touch operations). A robot apparatus provided with such a pendant eliminates arrangement of the dedicated operation keys, which is thus expected to make the pendant smaller in size, make the display screen larger in size, make the device lower in production cost.

CITATION LIST

Patent Literature

[PTL 1] JP-A-2006-142480

SUMMARY OF INVENTION

Technical Problem

In cases where the pendant is provided with such a touch panel, an operator slides operator's finger(s) on the touch panel surface, i.e., moves operator's finger(s) on the touch panel surface in two dimensional directions. This action makes it possible to provide the panel with inputs for a plurality of operations at the same time. In response to, for example, a direction commanded by a touch on the touch panel, a multiple-axis robot can be driven such that either each axis of the robot is operated or plural axes (such as XY axes) of the robot are operated concurrently. This way of operations makes it possible to improve maneuverability and shorten a teaching time, which are lead to improvement in operator's work.

However, in manually operating the robot, there are cases in which operating plural axes of the robot are not always advantageous. For example, such cases can be seen in a teaching work, in which a rough teaching and a fine teaching are generally performed. The rough teaching is for moving robot actions largely, while the fine teaching is for making the end effector locate at a target position. In the rough teaching, a concurrent operation of two axes (hereinafter, referred to as a two-axis mode, just for descriptive purposes) has higher usability, whilst in the fine teaching, an operation of only a single axis (hereinafter, referred to as a single-axis mode) has higher usability.

However, in operator's touch input operations, there may cause a problem that operator's fingers move unstably (i.e., deviations or drifts) on the touch panel. That is, when an operator intends to move the finger in straight on the touch panel, the finger is frequently moved to deviate from the straight line. If such deviations happen, the pendant device may judge that operations for two axes are inputted. In contrast, when switching the two-axis and single-axis modes in the rough and fine teachings, there are caused difficulties such as a decease in the operability and work efficiency, because frequent switching of the modes is obliged in the teachings. In addition, this kind of drawback is caused often not only in the teachings but also actually manipulating a robot by moving its each axis (arm).

SUMMARY

Thus it is desired to provide a robot operating apparatus and a robot operating program which are able to reduce operator's operations which result in robot movement in operator's undesired directions.

According an exemplary embodiment, in an apparatus for operating a robot, there is provided a touch panel having a panel plane (i.e., the upper planer flat portion (or surface) of the touch panel) on which a coordinate system is set and a determination area is set in the coordinate system. The coordinate system is given, as a point of origin thereof, a starting position, i.e., an operated position at which a touch operation is started. The coordinate system is set to have axes to which axes of a robot to be operated, i.e., manipulated are made to correspond. The determination area has a predetermined size. Then, based on a touch-operation arrival position which has arrived in the determination area, the apparatus selects an axis being operated among the robot axes made to correspond to the coordinate axes. In this way, the operator enables to select a robot axis for the operation, based on an operated direction extending from the touch-operation start position.

It is preferred that the apparatus is allowed to set an operating area having a predetermined width centered at the touch-operation arrival position. Therefore, even if the finger slightly shakes or moves obliquely when the operator intends a linear touch operation during a duration of the continued touch operation, it is preventable that the apparatus determines that an operating direction different from the user's targeted direction has been inputted. In other words, a margin is provided to the operating mode for the touch operation in touch operations in the same directions, thus reducing or avoiding an erroneous operation which results in an operation (or manipulation) of a robot axis which has not been desired by the operator. Operability and/or work efficiency and safety can be avoided from being deteriorated or reducing, while still reducing undesired situations in which the robot axis results in moving unintended directions.

Still preferably, in the apparatus, the coordinate system is set on the panel plane (the upper planer flat portion (or surface) of the touch panel. The coordinate system is set with the touch-operation start position which is adopted as the origin of the coordinate system. Based on a positional relationship with the touch-operation arrival position provided when a predetermined determination period of time elapses attar the touch operation is started, an axis to be operated among the robot axes having correspondence one by one to the coordinate axes is selected, and an operating area is set which has a preset width centered at the touch-operation arrival position.

In the foregoing apparatus according to the main configuration of the exemplary embodiment, an axis being operated is selected responsively to an event in which the touch operation arrives at a predetermined position. In contrast, in the apparatus according to the preferable example, such selection is made based on an operating position (serving as an arrival position) provided a predetermined period of time elapses. Hence, by this configuration, it also makes it possible to reduces events in which an axis being operated is switched to another one against an operator's target. In the same manner as that provided by the main configuration described above, operability and/or work efficiency can be avoided from being deteriorated or reducing, while still reducing undesired situations in which the robot axis results in moving unintended directions.

The remaining characteristic configurations, operations and effects according to the present disclosure will be explicitly provided by embodiments explained hereinafter with the accompanying drawings.

DETAILED DESCRIPTION OF THE PREFERRED EMBODIMENTS

Hereinafter various embodiments of the present invention will now be described with reference to the accompanying drawings. Common components or components which represent the same functions in the following embodiments are given the same reference numbers for the sake of a simplified explanation.

First Embodiment

Figure 1:
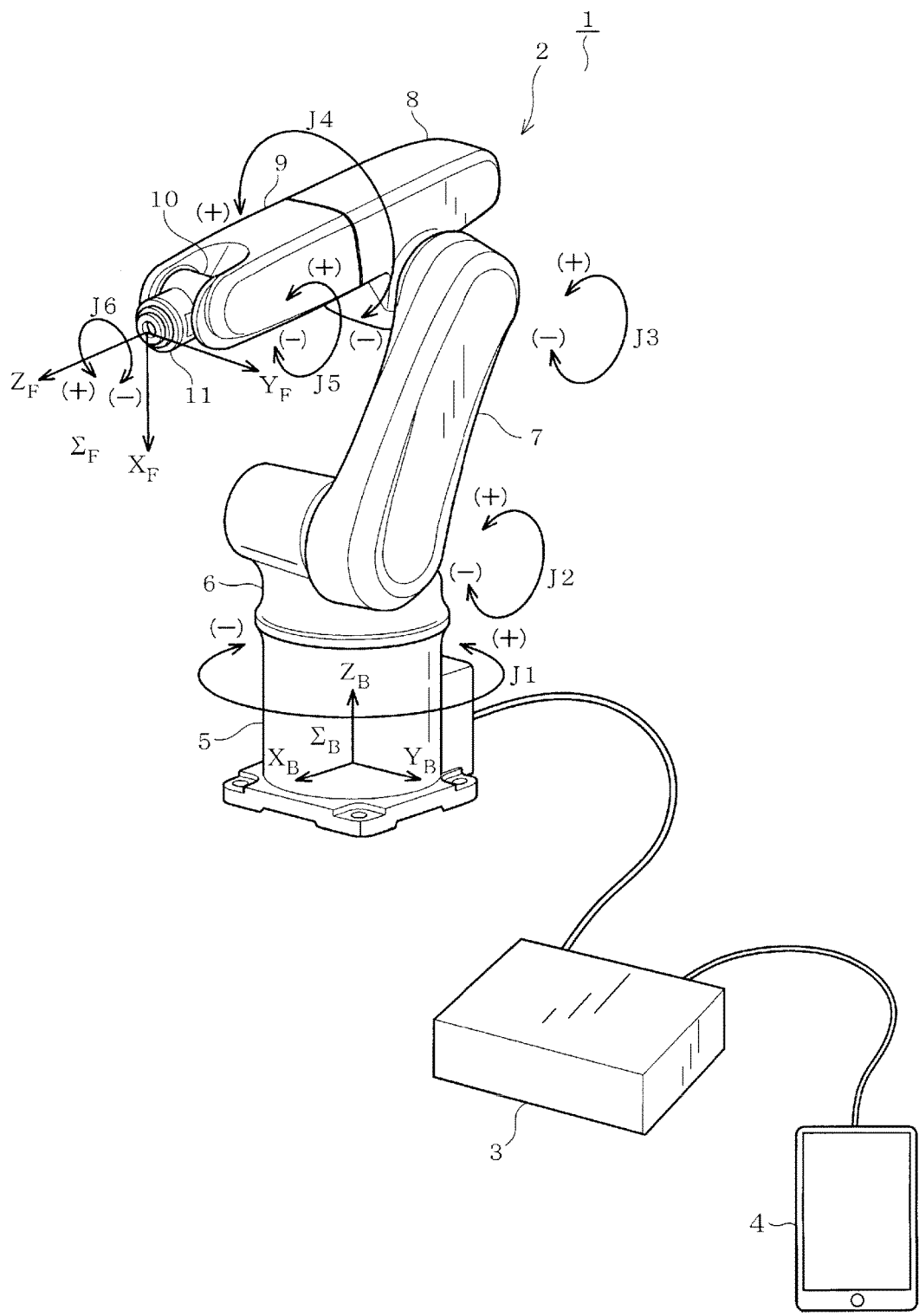
FIG. 1 is a perspective view pictorially showing the overall appearance of a robot system in which a robot operation apparatus according to a first embodiment is applied.

Referring to FIGS. 1 to 8, a first embodiment will now be described. As shown in FIG. 1, there is provided a robot system 1. The robot system 1 is provided with a vertical articulated robot 2, a controller 3 which controls movements of the robot 2, and a pendant 4 (providing a manipulating (or operating) apparatus for robots) communicably connected to the controller 3. This robot system 1 is realized as a general instructional robot system.

The robot 2 is provided as six-axis vertical articulated robot which has known structures, in which there is a base 5 and a shoulder 6 rotatably connected to the base 5 via a first axis (J1) having a Z-directional shaft center. The shoulder 6 is rotatably in the horizontal direction. To the shoulder 6, the lower end of a lower arm 7 is connected so as to be rotatable in the vertical direction. The lower arm 7 extends upward via a second axis (J2) having a Y-directional shaft center. To the tip end of the lower arm 7, a first upper arm 8 is rotatably connected via a third axis (J3) having a Y-directional shaft center, where the first upper arm 8 is rotatable in the vertical direction. The first upper arm 8 has a tin end to which a second upper arm 9 is twisted-rotatably connected via a fourth axis (J4) having an X-directional shaft center. The second upper arm 9 has an tip end to which a wrist 10 is rotatably connected via a fifth axis (J5) having a Y-directional shaft center, where the wrist 10 is rotatable in the vertical direction. A flange 11 is twisted-rotatably connected to connected to the wrist 10 via a sixth axis (J6) having an X-directional shaft center. The sixth axis is also referred as an end-effector axis for descriptive purpose.

The base 5, shoulder 6, lower arm 7, first upper 8, second upper arm 9, wrist 10 and flange 11 function as an arm of the robot 2. To the tip end of the arm, that is, the flange 11, a not-shown hand (also referred to as an end effector) is attached. The hand is for holding and conveying a not-shown work or holding a tool for processing a work. At each of the axes (J1 to J6) of links of the robot 2, there is provided an electric motor (not shown) which serves as a drive source in each link.

In this configuration of the robot 2, a reference coordinate system is set for controlling movements of the robots 2. In the present embodiment, there are provided a reference coordinate system ΣB based on the base 5 and a flange coordinate system ΣF based on the end-effector axis (J6). The reference coordinate system ΣB is a coordinate system which does not change when the robot 2 takes any pose, and has mutually-perpendicular $X_B$-, $Y_B$- and $X_B$-axes. The $Z_B$-axis is perpendicular to an installation surface. Meanwhile the flange coordinate system ΣF is a coordinate system in which the direction of the flange 11 is shown by a reference which is set at the origin of the end-effector axis, and mutually-perpendicular $X_F$-, $Y_F$- and $Z_F$-axes are set. The $Z_F$-axis is set to be coaxial with the end-effector axis, so that the direction of the $Z_F$-axis indicates the direction of the flange 11, that is, the direction of the end effector.

The controller 3 is provided as a control device for the robot 2, and is control means using a computer provided with a CPU (central processing unit), ROM (read-only memory), and RAM (random access memory), which are not shown. In this control means, executing a computer program enables movements of the robot 2 to be controlled. Practically the controller 3 is provided with drivers each configured to include an inverter and other circuits, and configured such that each of the electric motors is controlled in, for example, a feedback control manner, based on a signal indicating a rotation position of the motor. The rotation position is detected by an encoder arranged to each motor. The controller 3 is also provided with an operation command generating unit 3a, which responds to operation information transmitted from the pendant 4 so as to generate an operating command to operate (manipulate) the robot 2. The operation information indicates indicating that a touch operation is performed in which mode, i.e., modes of touch operations.

The pendant 4 is communicably connected to the controller via a connection cable. The pendant 4 is able to perform data communication, with wires or without wires, to and from the controller 3 via a communication interface (refer to FIG. 2 in which a communication I/F 24). Hence, information showing various operator's operations inputted to the pendant 4 is transmitted as operating information to the controller 3.

Figure 2:
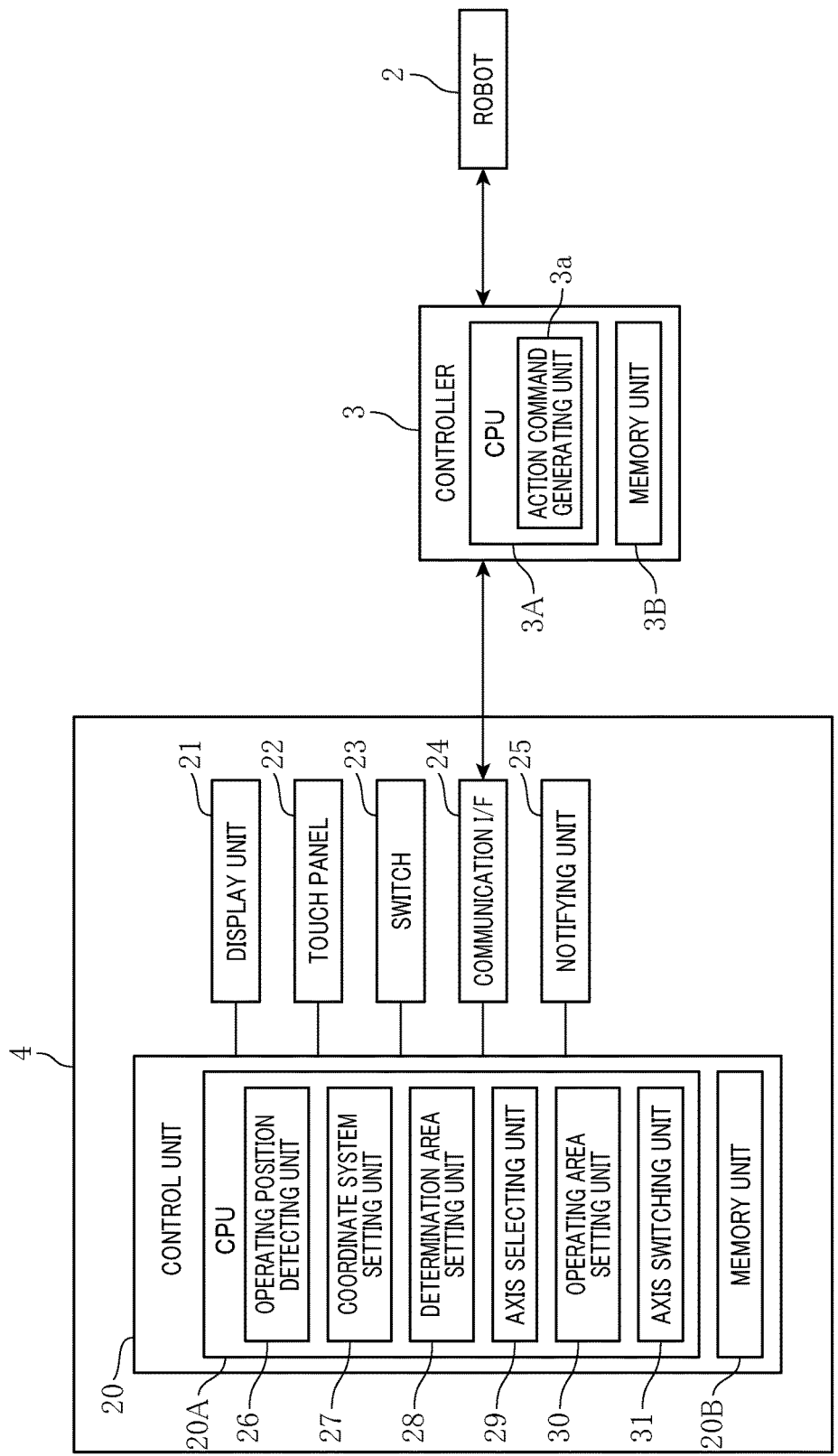
FIG. 2 is a block diagram pictorially showing an electric configuration of the robot operation apparatus.

The pendant 4 has a size which is fit to an operator so the operator is able to carry by hand and operate it. As shown in FIG. 2, this pendant 4 is provided with a controller 20, a display 21, a touch panel 22, a switch 23, a communication I/F 24, and a notification unit 25. The controller 20 is provided as a microcomputer with a CPU (central processing unit), a ROM (read-only memory), and a RAM (random access memory), which are not shown, and is configured to control the overall operations of the pendant 4. For instance, the controller 20 is able to read computer programs stored in a storage 20A (provided as a non-transitory computer readable medium) and perform the read programs. By this performance, the robot 2 can be started up and controlled in its postures and various parameters or information can be set for enabling the robot to be operated or manipulated.

The display 21 is provided, for example, as a liquid crystal display, so that the display has a display surface on which the touch panel is formed. The switch 23 is for example a power switch, which is a mechanical switch used to operate the pendant 4. Instead of this switch 23, a button(s) which serves as the same switch can be displayed on the display 21. An operator (a person which operate the pendant) gives the touch panel 22 and/or switch 23 various operations, thereby manually operating (or manipulating) the robot 2.

For example, the user uses the pendant 4 to change attitudes of the robot 2 or other actions. The user is able to manually operate (or manipulate) the robot 2 so as to perform various teaching operations, such as, setting a target position, a movement trajectory, and orientations of the end effector. At this time, for example, a menu screen, a setting input screen, and a status display screen are displayed in the display unit 21 as required. Hereafter, an operation inputted to the touch panel 22 by the user is referred to as a touch operation. The notifying unit 25 is composed of a speaker, a vibrator, and other components. The notifying unit 25 notifies the user of a response to an operation performed by the user and the like through sound, vibrations, or the like.

The pendant 4 functionally includes an operating position detecting unit 26, a coordinate-system setting unit 27, a determination area setting unit 28, an axis selecting unit 29, an operation area setting unit 30, and an axis switching unit 29. In the present embodiment, these units 26, 27, 28, 29, 30 and 21 are functionally provided by the controller 20 in which a computer performs preset software programs.

The operating position detecting unit 26 is capable of detecting an operated position provided by the user's touch operation, i.e., a user's contact position on the touch panel 22. Practically the operating position detecting unit 26 detects the operated position, as a coordinate on the touch panel surface when the touch operation is inputted. In addition, the operating position detecting unit 26 is configured to memorize therein user's operated positions provided during a one-time touch operation in a time sequential manner, and detect in real time both amounts of user's operations (i.e., amounts of change of operated positions) and orientations of the change of the operated positions during the user's touch operation. User's operations on the touch panel 22 are not limited to use of user's fingers, but can be performed using other devices such as a touch pen. In the following, for the sake of a simplified description, there is provided an example in which user's fingers are touched on the touch panel 22.

Although details will be described hereafter, the coordinate system setting unit 27 sets a coordinate system (an XY coordinate system; see FIG. 4) on the panel plane (or surface) of the touch panel 22. The axes (such as the $X_F$-axis and the $Y_F$-axis; see FIG. 4) of the robot 2, which are to be operated, are associated with the coordinate system in advance, with a start position (P0; see FIG. 4) as a point of origin. The start position is an operating position at which the touch operation is started. More specifically, the coordinate system setting unit 27 sets a coordinate system having two coordinate axes (an X-axis and a Y-axis; see FIG. 4) that are orthogonal to each other. In the coordinate system, the axes of the robot are respectively associated in advance with the coordinate axes, together with positive and negative action directions. In addition, the two axes of the robot associated with the coordinate axes are associated with predetermined areas of a first quadrant, a second quadrant, a third quadrant, and a fourth quadrant, together with the action directions.

Although details will be described hereafter, the determination area setting unit 28 sets a determination area (Rh; see FIG. 4) having a size that is set in advance. According to the present embodiment, the determination area is set in the periphery of the start position. Although details will be described hereafter, the axis selecting unit 29 selects an axis on which operation is to be performed, among the axes (such as the $X_F$-axis and the $Y_F$-axis; see FIG. 4) of the robot 2 associated with the coordinate axes. The axis selecting unit 29 makes the selection based on an arrival position (P1; see FIG. 5) that is an operating position at which the finger reaches the determination area. According to the present embodiment, the axis on which operation is to be performed is selected based on a positional relationship between the start position and the arrival position. In addition, although details will be described hereafter, based on whether the selected axis on which operation is to be performed is a single axis or two axes, the axis selecting unit 29 sets single-axis mode as an operating mode when a single axis is selected. Meanwhile, the axis selecting unit 29 selects two-axis mode as the operating mode when two axes are selected. In single axis mode, the single axis alone is operated. In two-axis mode, the two axes are simultaneously operated.

Although details will be described hereafter, the operating area setting unit 30 sets an operating area (Rs; see FIG. 6) having a width that is set in advance with the arrival position (point) as the center. More specifically, the operating area setting unit 30 sets the operating area as an area over which the operating mode set by the axis selecting unit 29 is continued. According to the present embodiment, the operating mode is "to operate the $X_F$-axis alone." Therefore, the operating area (Rs) is set on the overall screen including a negative side (X−) side, in addition to a positive side (X+ side).

Although details will be described hereafter, the axis switching unit 31 determines whether or not to switch the axis to be operated, based on whether or not the operating position is within the operating area. More specifically, although details will be described hereafter, the axis switching unit 31 switches the operating mode from single-axis mode to two-axis mode or from two-axis mode to single-axis mode, when the operating position leaves the operating area.

Figure 3:
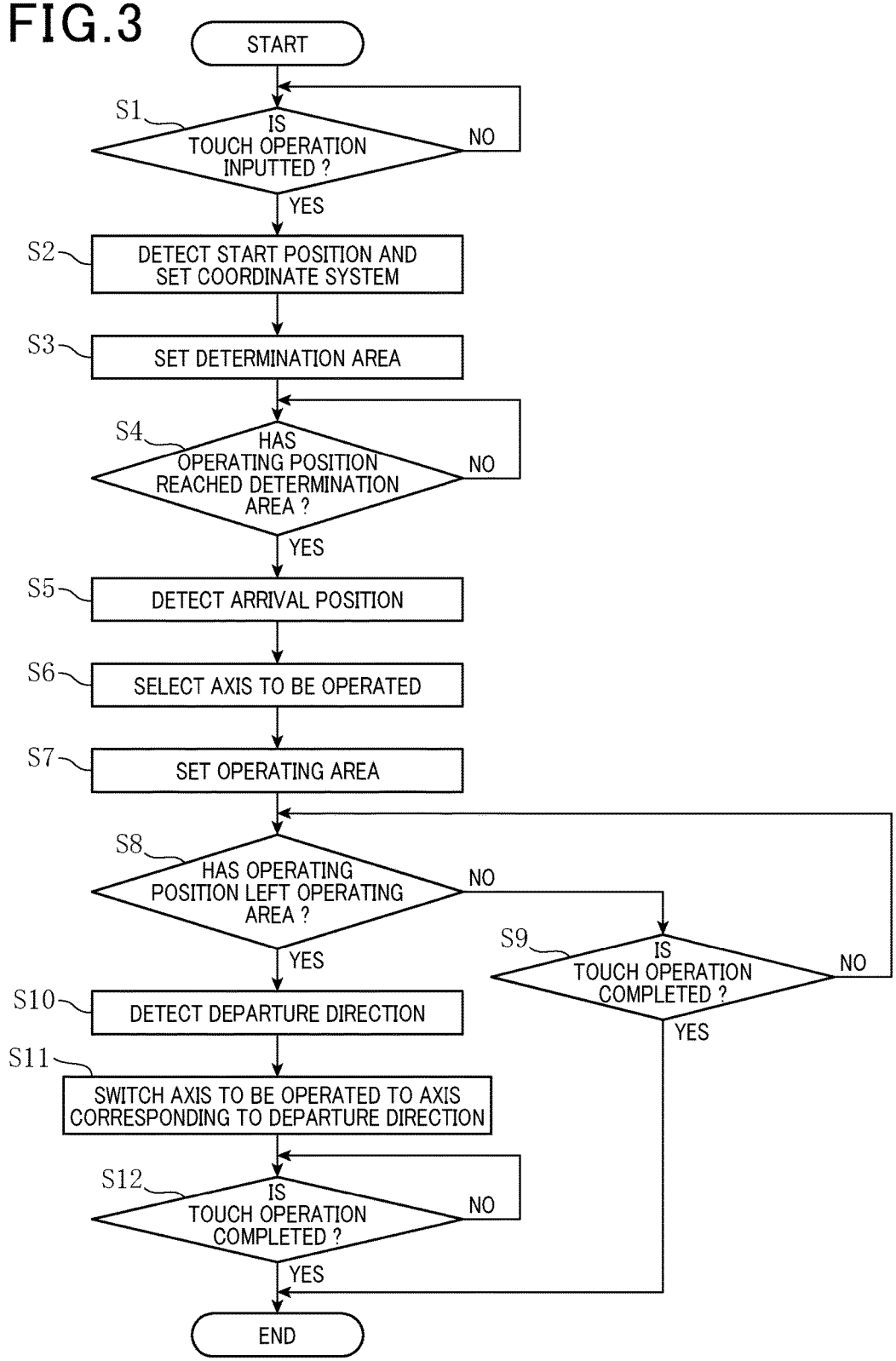
FIG. 3 is a flowchart pictorially showing a flow of processes performed in a robot operation program.

Next, the working of the above-described configuration will be described. The pendant 4 performs processes shown in FIG. 3. The processes performed in FIG. 3 are performed by the control unit 20. However, the pendant 4 is described as the main subject herein to simplify the description. In addition, although not shown, an operating position detecting process for detecting the operating position when the touch operation is inputted is performed at all times, in parallel with the processes in FIG. 3 and at real-time.

The pendant 4 determines whether or not a touch operation is inputted (S1). When determined that a touch operation is not inputted (NO at S1), the pendant 4 waits for a touch operation to be inputted. Meanwhile, when determined that a touch operation is inputted (YES at S1), the pendant 4 detects the start position and sets the coordinate system (S2). The process at step S2 corresponds to a coordinate system setting process. Specifically, when the operator touches the touch panel 22 as shown in FIG. 4(A), the pendant 4 detects the position that is touched by the operating position detecting unit 26, and sets the detected position as the start position (P0).

Then, the pendant 4 sets the coordinate system (XY coordinate system) on the panel plane (or surface) of the touch panel 22. With the start position (P0) as the point of origin, the coordinate system has two coordinate axes (X-axis and Y-axis) that are orthogonal to each other. The axes being operated of the robot 2 are associated with the coordinate system, in advance. The process at step S2 corresponds to the coordinate system setting process. Hereafter, an upward direction, a downward direction, a rightward direction, and a leftward direction on the screen in a state in which the operator is gripping the touch panel 22 are respectively described as an upward direction, a downward direction, a rightward direction, and a leftward direction on the panel plane.

According to the present embodiment, the X-axis of the XY coordinate system is provided along the leftward and rightward directions on the panel plane (or surface). The X-axis is associated with the $X_F$-axis of the flange coordinate system ΣF. More specifically, a positive direction of the X-axis (the rightward side on the panel plane; also referred to, hereafter, as the X+ side for convenience) is associated with an operation for moving the robot 2 in the positive direction on the $X_F$-axis. A negative direction of the X-axis (the leftward side on the panel plane; also referred to, hereafter, as the X− side for convenience) is associated with an operation for moving the robot 2 in the negative direction on the $X_F$-axis.

In addition, the Y-axis of the XY coordinate system is provided along the upward and downward directions on the panel plane. The Y-axis is associated with the $Y_F$-axis of the flange coordinate system ΣF. More specifically, a positive direction of the Y-axis (the upward side on the panel plane; also referred to, hereafter, as the Y+ side for convenience) is associated with an operation for moving the robot 2 in the positive direction on the Y-axis. A negative direction of the Y-axis (the downward side on the panel plane; also referred to, hereafter, as the Y-side for convenience) is associated with an operation for moving the robot 2 in the negative direction on the $Y_F$ axis. That is, the X-axis and the Y-axis are set for the operating mode (single-axis mode) in which the robot 2 is moved on either of the $X_F$-axis and the $Y_F$-axis.

In addition, according to the present embodiment, in correspondence to the operating mode (two-axis mode) in which the two axes ($X_F$-axis and $Y_F$-axis) associated with the axes (X-axis and Y-axis) of the XY coordinate system are simultaneously moved, the pendant 4 associates the axes to be operated with the predetermined areas of the first quadrant, the second quadrant, the third quadrant, and the fourth quadrant of the XY coordinate system, together with the action directions thereof. Specifically, the first quadrant of the XY coordinate system is associated with the X+ direction and the Y+ direction in two-axis mode. The second quadrant of the XY coordinate system is associated with the X− direction and the Y+ direction in two-axis mode. The third quadrant of the XY coordinate system is associated with the X− direction and the Y− direction in two-axis mode. The fourth quadrant of the XY coordinate system is associated with the X− direction and the Y+ direction in two-axis mode.

That is, in the XY coordinate system, a total of eight types of axes to the operated, that is, four types respectively corresponding to the positives and negatives of the coordinate axes, and four types corresponding to the above-described first quadrant to fourth quadrant, are set. Therefore, as shown in FIG. 4(B), the XY coordinate system is equally divided in the circumferential direction, with the start position (P0) as the point of origin. The XY coordinate system is divided into eight areas (four areas that are X+, X−, Y+, and Y− for single-axis mode; and four areas that are X+Y+, X−Y+, X−Y−, and X−Y+ for two-axis mode) associated with either of single-axis mode and two-axis mode.

The axes to be operated are set in advance before the processes shown in FIG. 3 are performed, or when the processes shown in FIG. 3 are started. According to the present embodiment, the axes to be operated are associated with an XY operation of the flange 11. However, the axes to be operated are not limited thereto, and may be associated with each axis operation.

Next, the pendant 4 sets the determination area having a size that is set in advance, in the periphery of the start position (S3). The process at step S3 corresponds to a determination area setting process. At this time, the pendant 4 sets the determination area to a size that is not touchable by the finger in the start position. The process at step S3 corresponds to the determination area setting process. Specifically, according to the present embodiment, the pendant 4 sets a determination area (Rh) that has a circular ring shape with a radius r and with the start position (P0) as the center, as shown in FIGS. 4(A) and (B). In other words, the determination area (Rh) is formed into a line segment. A dead zone is set between the start position (P0) and the determination area (Rh).

The determination area (Rh) is divided into eight areas because, as described above, eight areas are associated with the XY coordinate system. That is, the determination area (Rh) is divided into four areas corresponding to X+, X−, Y+, and Y− for single-axis mode, and four areas corresponding to X+Y+, X−Y+, X−Y−, and X−Y+ for two-axis mode. The axis to be operated is selected by the determination area (Rh).

That is, the pendant 4 that has set the determination area determines whether or not the operating position has reached the determination area (S4). In other words, the pendant 4 determines whether or not the finger moving through the dead zone set between the start position (P0) and the determination area (Rs) has reached the determination area. When determined that the operating position has not reached the determination area (NO at S4), the pendant 4 waits for the operating position to reach the determination area. When the touch operation ends, that is, when the finger is removed, without the operating position reaching the determination area, the pendant 4 ends the process.

Figure 5:
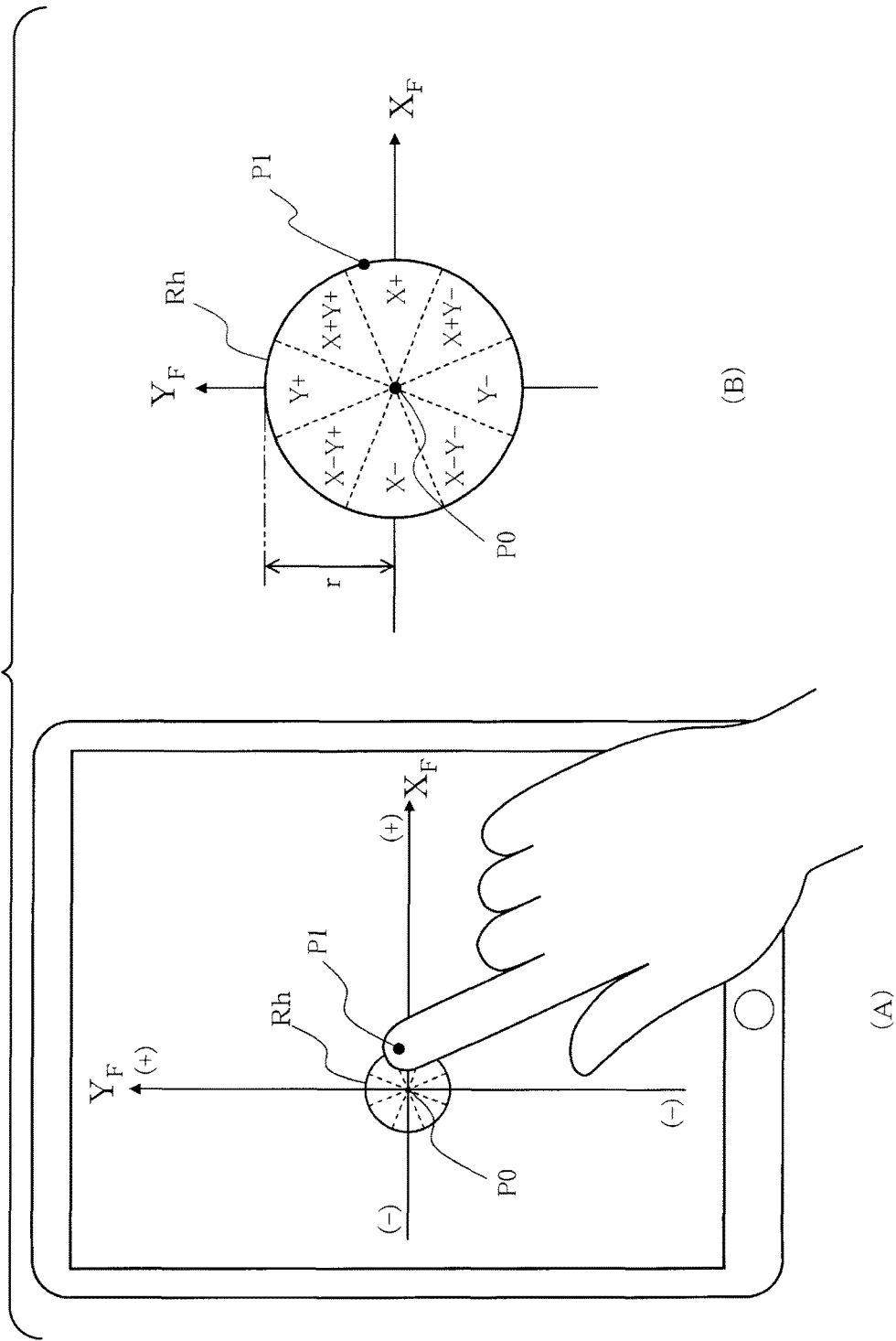
FIG. 5 is a view pictorially showing a state where the operating position has reached the determination area.
Figure 6:
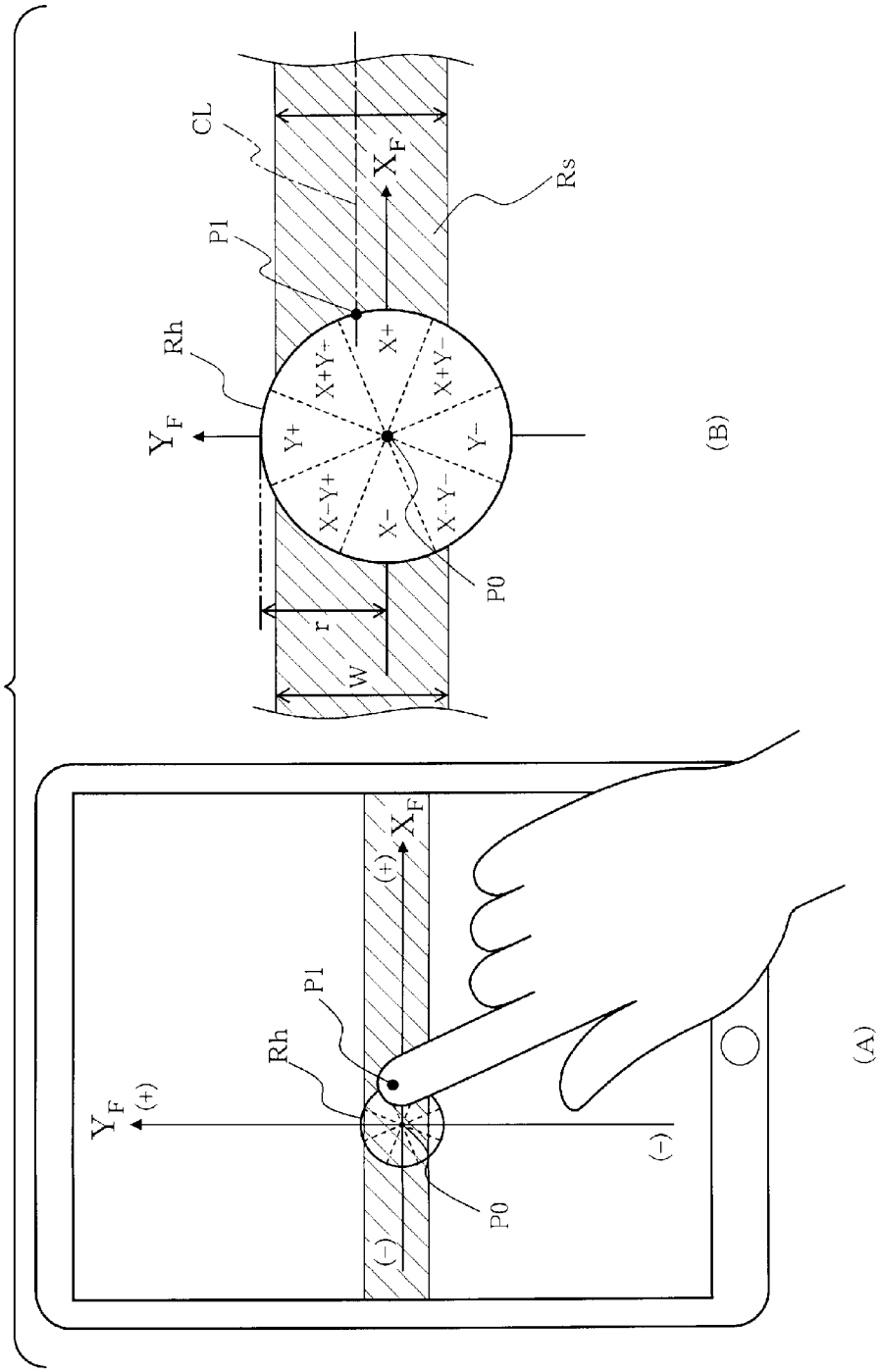
FIG. 6 is a view pictorially showing how to set an operating area.

Meanwhile, when determined that the operating position has reached the determination area (YES at S4), the pendant 4 detects the operating position at which the determination area is reached as the arrival position (S5). The pendant 4 selects the axis to be operated based on the positional relationship between the start position and the arrival position (S6). The processes at steps S5 and S6 correspond to an axis selecting process. Specifically, as shown in FIG. 5(A) and FIG. 5(B), for example, when the operator moves the finger and, as a result, reaches point P1 in the operating area (Rh), point P1 corresponds to the arrival position. In the example in FIG. 5, the arrival position (P1) is included in X+ of the determination area (Rh) that is divided into eight areas. Therefore, the pendant 4 determines that the axis to be operated is the $X_F$-axis and an operation for movement in the positive direction is inputted by the operator.

In addition, according to the present embodiment, because the selected axis is a single axis, the pendant 4 sets the operating mode for operating the robot 2 to single-axis mode in which only the $X_F$-axis of the robot 2 is operated. In this way, the pendant 4 selects the axis to be operated based on the operating direction (the direction from the start position towards the arrival position; the direction in which the finger moves without being removed from the touch panel 22) during the touch operation. In addition, the pendant 4 sets the operating mode to either of single-axis mode and two-axis mode, based on whether the selected axis is a single axis or two axes.

When the selection of the axis to be operated and the setting of the operating mode are performed, the pendant 4 sets the operating area (S7). Specifically, as shown in FIGS. 6(A) and (B), the pendant 4 sets the operating area (Rs) having a width (W) that is set in advance, with the arrival position (P1) as the center. At this time, because the selected axis is the $X_F$-axis, the pendant 4 sets a center line (CL) of the operating area (Rs) such as to run along (in parallel with) the X-axis associated with the $X_F$-axis. The width (W) of the operating area (Rs) is prescribed in advance.

Figure 7:
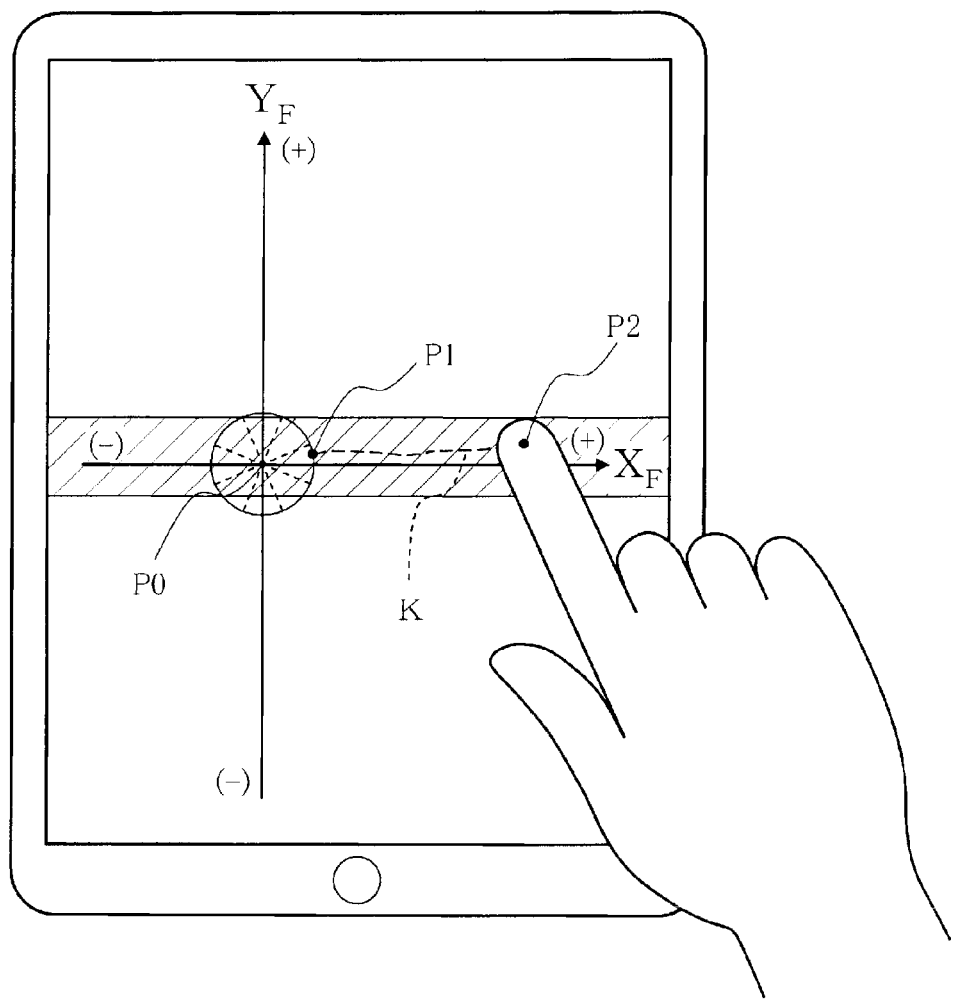
FIG. 7 is a view pictorially showing a situation where an operating position is within the operating area.

The operating area (Rs) is set as an area over which the operating mode (in this case, single-axis mode) set by the axis selecting unit 29 is continued. When the operating position is included in the operating area (Rs), the pendant 4 continues the operating mode that is currently set. A reason for this is as follows. For example, as shown in FIG. 7, when the operator moves the finger during the touch operation, it can be considered that the finger may slightly shake, or may not necessarily move in parallel with the X-axis despite the operator believing that the finger is moving straight in X-axis direction. In FIG. 7, a movement trajectory of the finger (history of operating positions) is indicated by a broken line K.

It is thought that a situation such as this tends to particularly occur when the operator operates the robot 2 while looking at the robot 2, or in other words, the operator operates the robot 2 without looking at the screen of the pendant 4. In a situation such as this, even should the finger movement be that moving away from the X-axis, if the movement is slight, it can be assumed that the operator intends to operate only the $X_F$-axis. Therefore, when the operating area (Rs) having the width (W) is set, the pendant 4 determines whether or not the detected operating position has left the operating area (S8), as shown in FIG. 3. At this time, when determined that the operating position has not left the operating area (NO at S8), the pendant 4 further determines whether or not the touch operation is completed (S9). When determined that the touch operation is not completed (NO at S9), the pendant 4 proceeds to step S8 and repeats detection of the operating position.

That is, when the operating position is within the operating area (Rs), the pendant 4 continues the current operating mode. As a result, slight shaking of the finger and the like can be nullified. Consequently, unintended switching of the operating mode can be prevented. When determined that the touch operation is completed (YES at S9), the process is ended. Meanwhile, in above-described rough teaching and the like, the operator may wish to simultaneously move two axes. In this case, when the configuration is such that an operation for switching the operating mode is inputted, work efficiency may decrease, and safety may decrease due to the operator being required to look away from the robot 2.

Figure 8:
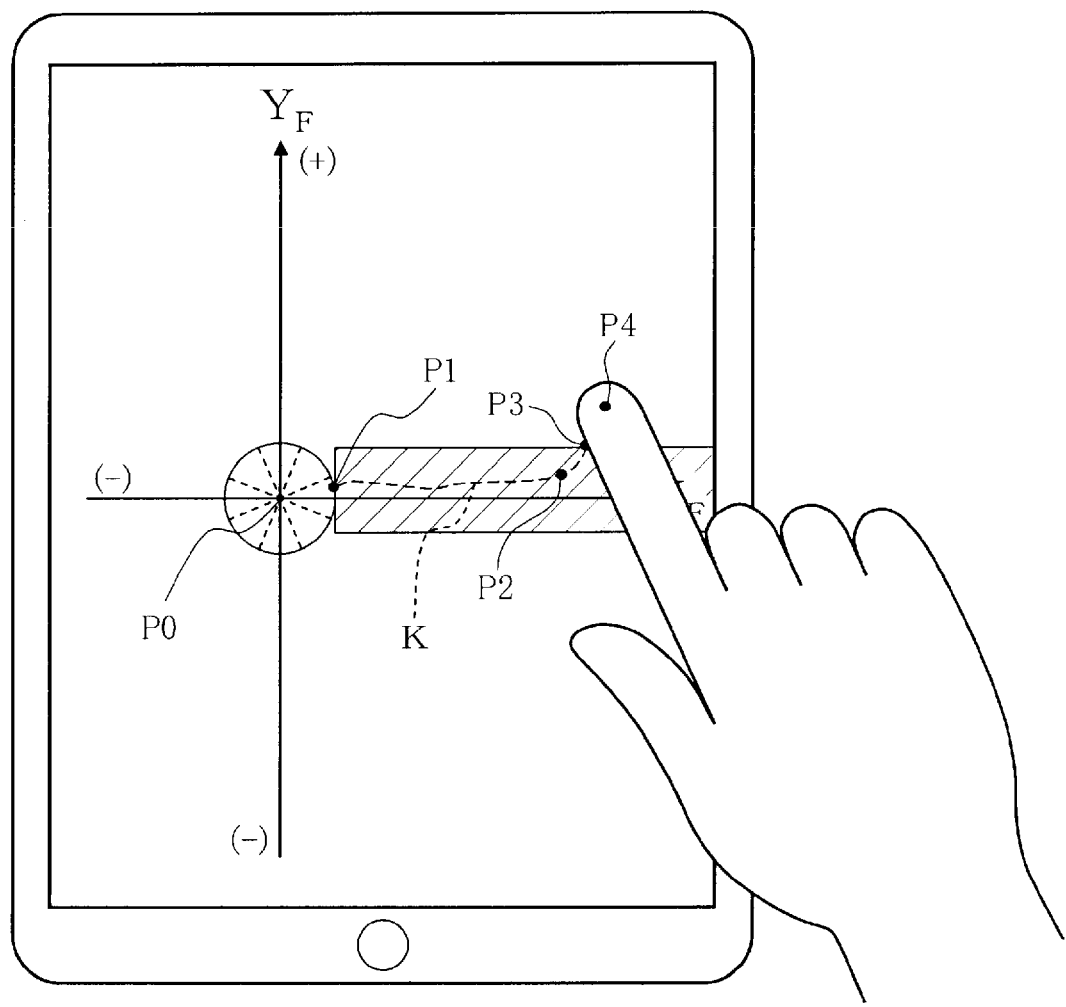
FIG. 8 is a view pictorially showing a situation where an operating position is departed (or deviated) from the operating area.

Therefore, when determined that the detected operating position has left the operating area (Rs) (YES at S8), the pendant 4 detects the departure (or deviating) direction (S10) and switches the axis to be operated to the axis corresponding to the departure direction (S11). In addition, according to the present embodiment, the pendant 4 also switches the operating mode. The processes at steps S8 to S11 correspond to an axis switching process. Specifically, for example, as a result of the operator moving the finger to the upper side of the screen as shown in FIG. 8, the operating position leaves the operating area (Rs) at point P3. In this case, because the operating position has left the operating area, it can be assumed that the operator intends to transition from single-axis mode to two-axis mode. In addition, because the operator moves the finger to the upper side of the screen, it can be assumed that the operator intends to operate the robot 2 in the X+Y+ direction.

Therefore, the pendant 4 switches the axis to be operated from a single axis ($X_F$-axis) to two axes ($X_F$-axis and $Y_F$-axis). In addition, the pendant 4 switches the operating mode from single-axis mode to two-axis mode. As a result, the operator can switch the axis to be operated and switch the operating mode by finger movement, or in other words, without looking at the display unit 21 of the pendant 4. At this time, the pendant 4 operates the robot 2 based on an operating amount (an amount of change in the operating position) from when the operating position leaves the operating area. That is, in the example in FIG. 8, when the operating position moves in the upward direction from a position (P2) within the operating area and leaves the operating area at the departure position (P3), and operation is performed to a position (P4) outside of the operating area, the operating amount in the positive Y-axis direction between P2 and P3 is omitted. Only the operating amount in the positive Y-axis direction after the departure position (P3) is reflected in the operation towards the positive side (Y+ side) on the $Y_F$-axis.

Then, when determined that the touch operation is completed (YES at S12), the pendant 4 ends the process. In this way, the pendant 4 performs selection of the axis to be operated, setting of the operating mode of the robot 2 for operating the axis, and switching of the operating mode, based on the operating position when the touch operation is inputted.

According to the embodiment described above, the following effects can be achieved. The pendant 4 that serves as the robot operating apparatus sets a coordinate system on the panel plane of the touch panel 22. The axes of the robot 2 to be operated are associated with the coordinate system, in advance. In addition, the pendant 4 sets the determination area having a size that is set in advance. The pendant 4 selects the axis to be operated, among the axes of the robot 2 associated with the coordinate axes, based on the arrival position that is the operating position when the determination area is reached.

As a result, the operator can select the axis to be operated by the operating direction of the finger from the position at which the touch operation is started. At this time, as a result of the determination area being set in the periphery of the start position and the axis to be operated being set based on the positional relationship between the start position and the arrival position, as according to the present embodiment, the axis can be accurately selected from the point in time at which the touch operation is started.

Figure 4:
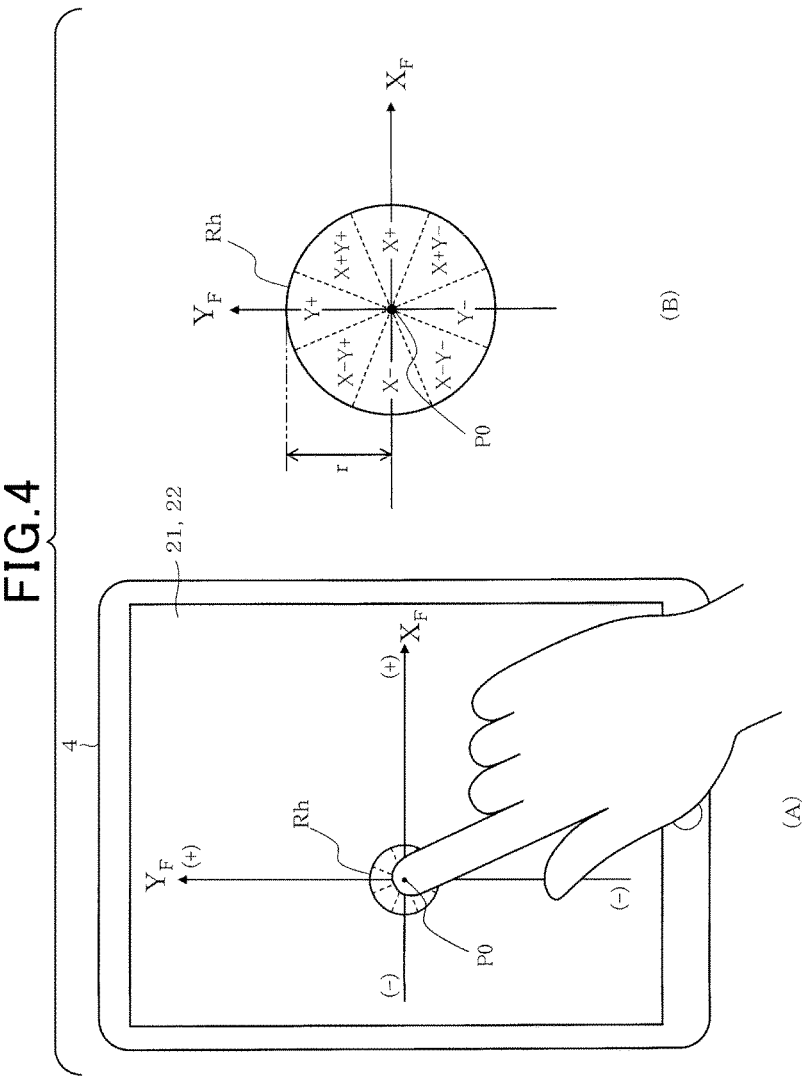
FIG. 4 is a view pictorially showing an operating mode and a determination area provided at a time when a touch operation starts.

In addition, as a result of the determination area being provided in a position away from the start position, the axes to be operated can be associated with the determination area in a state in which a certain amount of range is provided, as shown in FIG. 4 and the like. Therefore, even should the finger slightly shake before reaching the determination area, or be actually slightly misaligned from the X-axis regardless of the operator believing that the finger is moving along the X-axis, the axis intended by the operator can be continuously selected as the axis to be operated. In addition, because the operating area is set with the arrival position as the center, a margin for switching the axis can be ensured. Risk of the axis to be operated being unintentionally switched can be reduced.

In addition, the pendant 4 sets the operating area having a width that is set in advance with the arrival position as the center, and switches the axis to be operated based on whether or not the operating position is within the operating area. As a result, the operator can switch the axis to be operated by removing the operating position from the operating area, that is, by moving the finger by a large amount to some extent. In this way, in the pendant 4, even in cases in which the axis to be operated is frequently switched, such as during a fine teaching operation, a dedicated operation for only switching the axis is not required to be inputted. Switching of the axis can be performed as an extension of the operation of the robot 2.

In addition, as long as the operating position does not leave the operating area, or in other words, when the operator intends to operate only a single axis, even should the finger slightly shake or not accurately move along the coordinate axis, the other axis is not operated. Therefore, operation of an unintended axis can be prevented. As a result, operability is improved, and work efficiency can be improved, such as by shortening the teaching time.

In addition, selection of the axis to be operated and switching of the axis can be performed merely by the finger being moved. In addition, slight shaking of the finger and the like are permitted as a result of the operating area being set. Therefore, the operator can intuitively operate the robot 2. That is, the operator can operate the robot 2 without looking at the screen of the pendant 4, or in other words, while viewing the robot 2. Therefore, safety does not decrease. As a result, the axis to be operated can be switched without operability and work efficiency decreasing, and also without safety decreasing.

In addition, the pendant 4 associates the two axes of the robot 2 to the coordinate axes, in advance, together with the positive and negative action directions. The pendant 4 associates the two axes of the robot 2 associated with the coordinate axes to the predetermined areas of the first quadrant, the second quadrant, the third quadrant, and the fourth quadrant of the coordinate system, together with the action directions. As a result, the operator can select the axis to be operated as being either a single axis or two axes, and can individually select the movement directions of the axes.

Based on whether the axis to be operated is a single axis or two axes, the pendant 4 sets single-axis mode as the operating mode for operating the robot 2 when the axis to be operated is a single axis. In single-axis mode, the single axis is operated alone. Meanwhile, the pendant 4 sets two-axis mode as the operating mode when the axis to be operated is two axes. In two-axis mode, the two axes are simultaneously operated. The pendant 4 sets the operating area as the area over which the operating mode is continued. Based on whether or not the operating position has left the operating area, the pendant 4 switches the operating mode from single-axis mode to two-axis mode or from two-axis mode to single-axis mode.

As a result, even should the finger slightly shake during the touch operation, or not accurately move along the coordinate axis, the operating mode is not switched. Therefore, unintentional switching of the operating mode can be prevented. Consequently, deterioration of operability can be prevented. In addition, in the pendant 4, a robot operating program including the operating position detecting process, the coordinate system setting process, the determination area setting process, the axis selecting process, the operating area setting process, and the axis switching process is run. As a result, effects similar to those of the above-described robot operating apparatus, such as switching of the axis to be operated without decrease in operability and work efficiency, as well as without decrease in safety, can be achieved.

Second Embodiment

Figure 9:
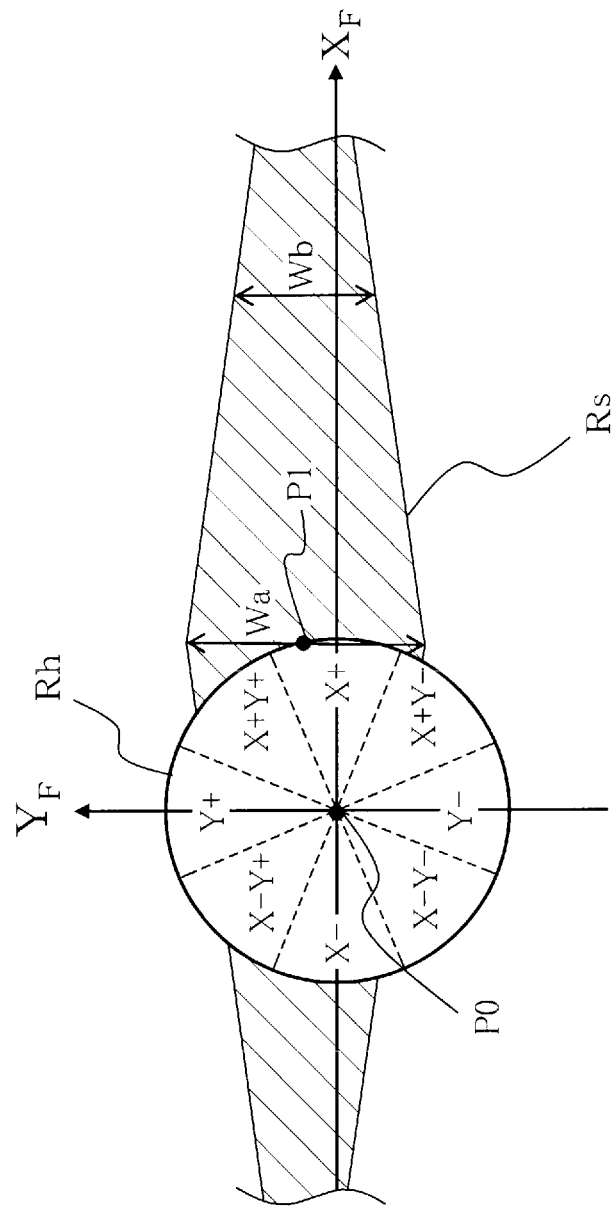
FIG. 9 is a view (part 1) pictorially showing another example of setting the operating area, which is according to a second embodiment.

A second embodiment will be described below, with reference to FIG. 9 to FIG. 12. According to the first embodiment, the operating area is set to have the same width. However, the width may be changed depending on the distance from the arrival position. For example, as shown in FIG. 9, setting the width to become narrower (Wa>Wb) as the distance becomes farther from the arrival position can be considered. When the finger is moved within a range that is relatively near the arrival position, the movement distance of the robot 2 is relatively short. Meanwhile, when the finger is moved over a range that is relatively far from the arrival position, the movement distance of the robot 2 is relatively long. That is, the operator intends to move the robot 2 by a large amount, as the distance becomes farther away from the arrival position.

Therefore, as a result of the operating area being set to become narrower as the distance from the arrival position becomes farther, for an operator who intends to move the robot 2 through small movements, switching of the axis and the operating mode can be prevented unless a clear operation (that is, movement of the finger out of the operating area) is made. Meanwhile, for an operator who intends to move the robot 2 through large movements, the axis and the operating mode can be switched by short movement distances of the finger. Deterioration of usability, such as the operator running out of space on the panel plane of the touch panel 22 in which to move the finger, can be prevented.

Conversely, when the finger is not moving straight, it is expected that the shifting in the width direction will increase as the distance becomes farther away from the arrival position. Therefore, the operating area is set to be wider as the distance becomes farther from the arrival position (that is, Wa<Wb), when the center line of the operating area is provided along the coordinate axis. The risk of the action direction being unintentionally switched or the action being unintentionally ended while the operator is believing that the finger is moving straight can be reduced. In addition, when the center line of the operating area is set along the operating direction (that is, along the direction from the start position towards the arrival position), the operating area can be set to become narrower as the distance becomes farther from the arrival position, as described above.

Figure 10:
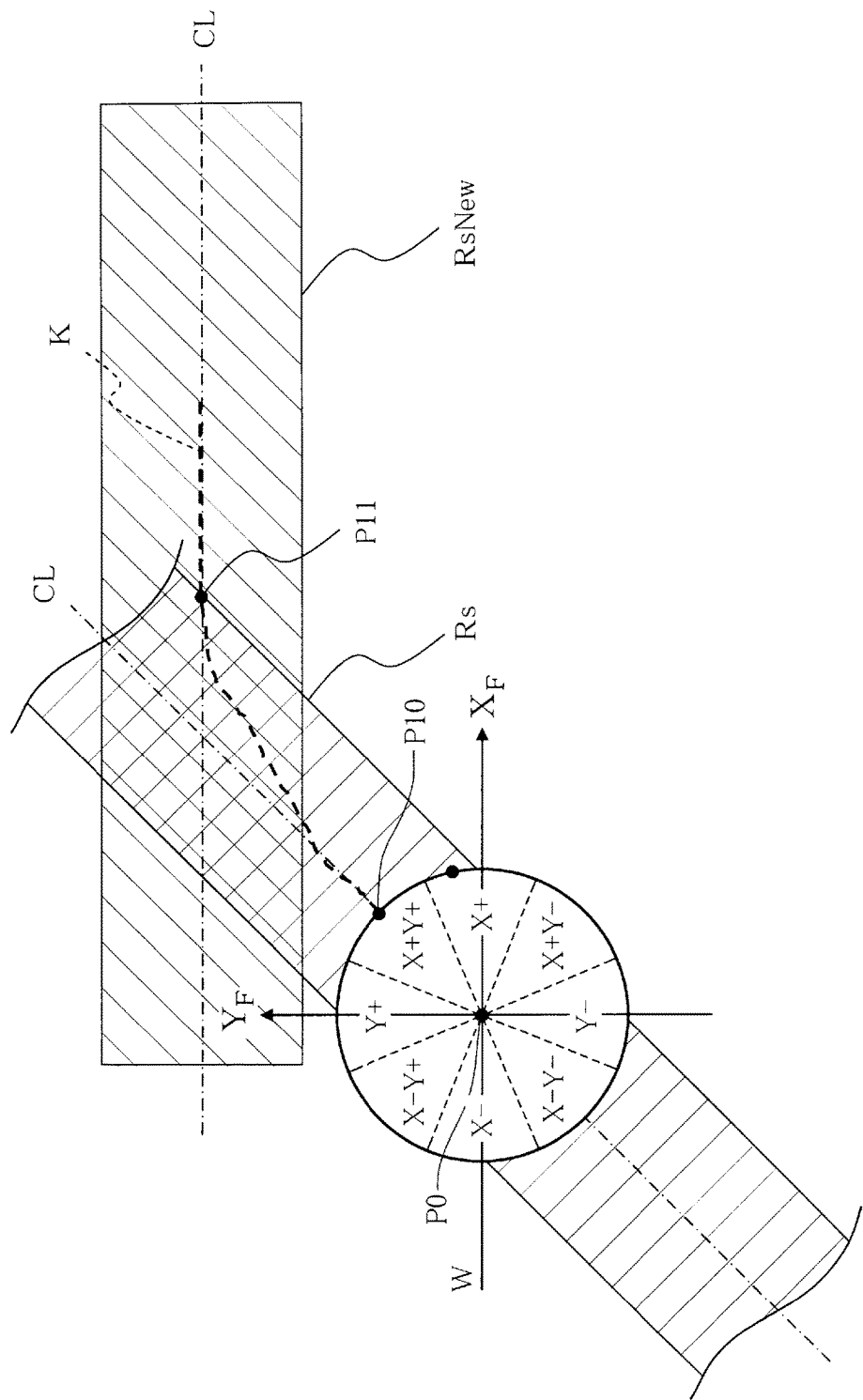
FIG. 10 is a view (part 2) pictorially showing another example of setting the operating area.
Figure 11:
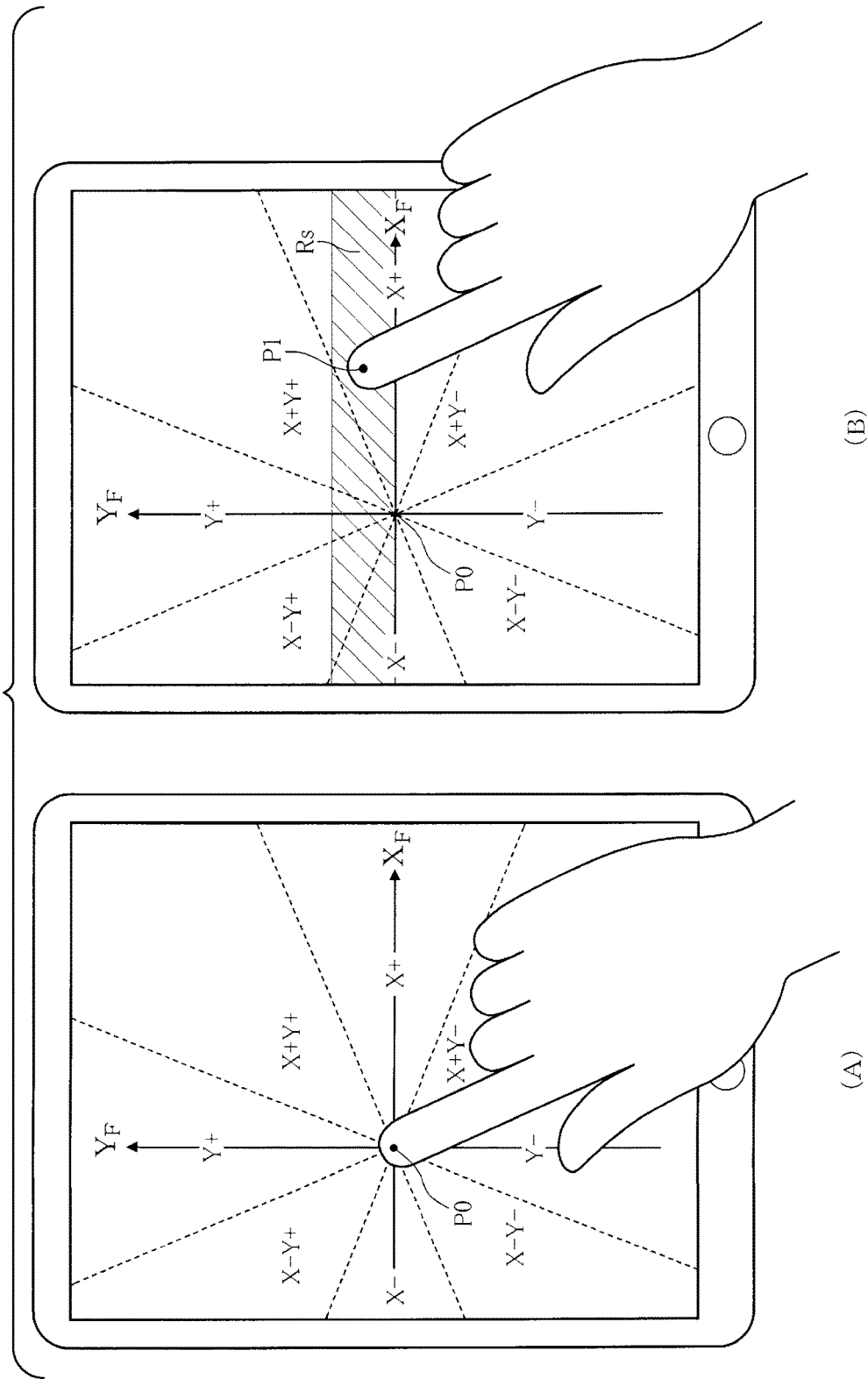
FIG. 11 is a view pictorially showing a relationship between the operating mode and an axis to be operated.

According to the first embodiment, an example in which a single operating area is set is given. However, a new operating area of which the center is the departure (deviated) position may be set, when the axis to be operated or the operating mode is switched. The departure position is the operating position at which the finger leaves the operating area. Specifically, as shown in FIG. 10, for example, two axes are selected as the axis to be operated and the determination area (Rs) is set, based on the start position (P0) and the arrival position (P10). Subsequently, a new operating area (RsNew) may be set. The center of the new operating area is the departure position (P11) at which the operating position leaves the determination area (Rs).

When the operating position leaves as in the example in FIG. 10, the new operating area (RsNew) may be set based on the departure direction (the operating position leaves the operating area (Rs) towards the X-axis side), the movement direction after departure (a movement trajectory (K) that substantially runs along the X-axis from the departure position P11), or the like. As a result, even when the axis to be operated is switched, operation can be performed on the axis to which the switch is made during the subsequent operation. Usability improves. In this case, during departure, the operating mode may be switched in addition to the axis. When a process such as this is actualized, for example, the pendant 4 may proceed to step S6 after determining NO at S12 in FIG. 3.

According to the first embodiment, the axis is selected by the determination area having a predetermined size being set with reference to the start position, that is, based on the concept of distance. However, the axis may be selected based on the concept of time. That is, the axes of the robot 2 and the action directions are associated with the coordinate system having the start position as the point of origin. The axis may be selected based on the action direction to which the arrival position corresponds, the arrival position being the operating position when a predetermined determination time has elapsed from the start of the touch operation. Specifically, for example, as shown in FIG. 11(A), in a manner similar to that according to the first embodiment (see FIG. 4), on an XY coordinate system in which the start position (P0) is the point of origin, the action directions may be associated with areas divided in the circumferential direction with the start position (P0) at the center. As shown in FIG. 11(B), the axis associated with the area (X+ direction in FIG. 11(B)) including the arrival position (P1) may then be selected as the axis to be operated.

As a result of a configuration such as this as well, the risk of the axis to be operated being switched against the intentions of the operator can be reduced. In a manner similar to the pendant 4 (robot operating apparatus) according to the above-described embodiment, effects such as reducing the risk of action in an unintended direction, while preventing decrease in operability and work efficiency, can be achieved.

According to the first embodiment, an example in which association is made with the flange coordinates (ΣF) is described. However, the axes to be operated may be other axes. That is, the present invention can also be applied to each axis operation of the robot 2. For example, as shown in FIG. 12(A), the J1 axis (first axis; see FIG. 1) may be associated with the X-axis direction of the XY coordinate system set in the touch panel 22. The J2 axis (second axis; see FIG. 1) may be associated with the Y-axis direction. Alternatively, as shown in FIG. 12(B), the J6 axis (sixth axis; see FIG. 1) may be associated with the X-axis direction. The J5 axis (fifth axis; see FIG. 1) may be associated with the Y-axis direction. Even in such correspondence relationships, as a result of the operating area being provided as described according to the embodiment, the risk of action in an unintended direction can be reduced.

Figure 12:
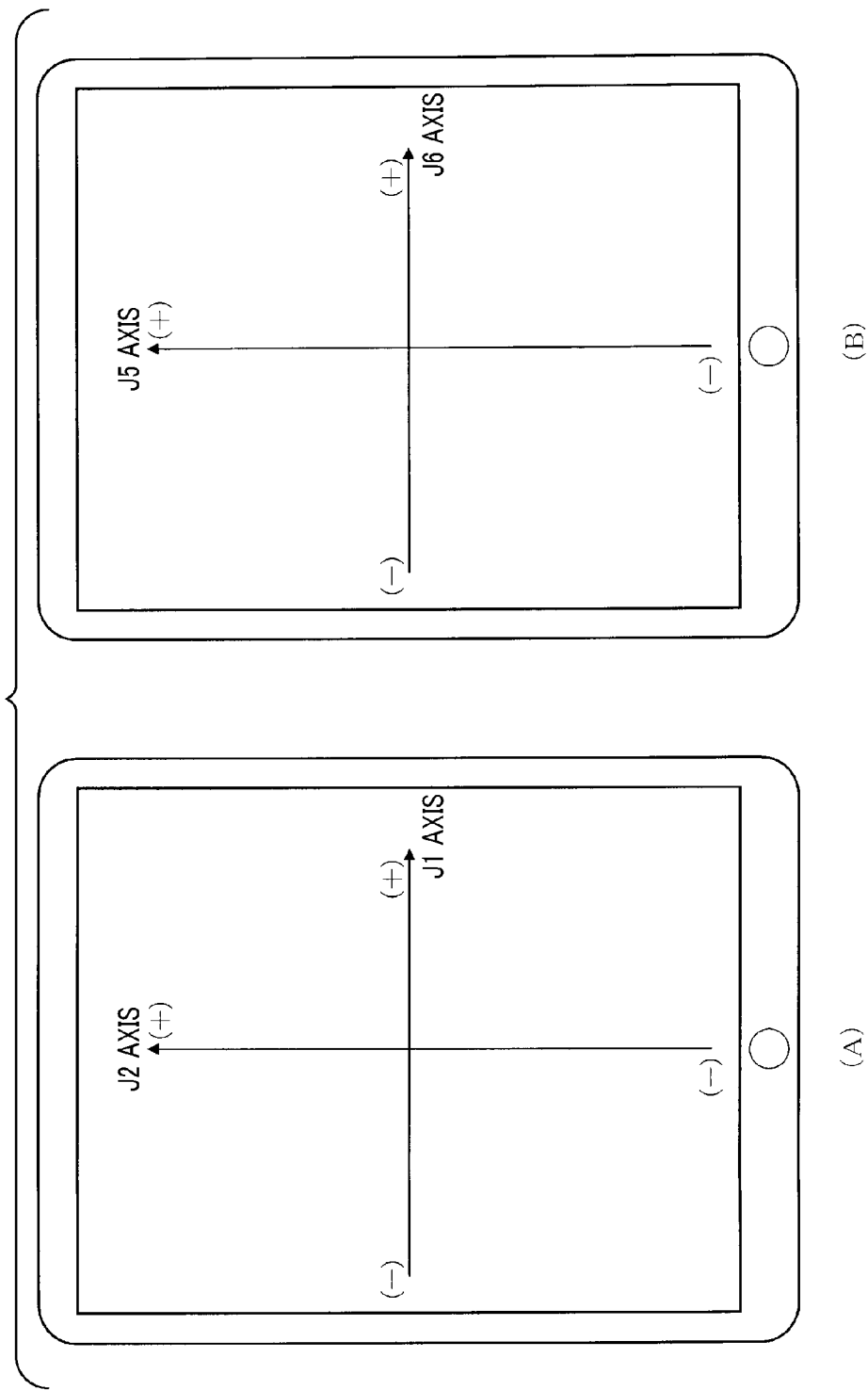
FIG. 12 is a view pictorially showing another example of a combination of axes to be operated.

In addition, in the correspondence relationships shown in FIG. 12, operating sensation during touch operation by the operator and the actual action direction of the robot match or are similar. Therefore, it is thought that operability further improves. That is, as shown in FIG. 1, the J1 axis rotates in a direction horizontal to the installation surface, that is, the plane on which the operator is standing. Therefore, when the operator inputs a touch operation in a lateral direction along the X-axis direction, the arm of the robot 2 turns in the lateral direction as a result of rotation of the first axis.

In addition, as shown in FIG. 1, the J2 axis is horizontal in relation to the installation surface. Therefore, when the J2 axis is rotated, the arm of the robot 2 moves up and down. Consequently, as a result of the J2 axis being associated with the Y-axis and the action direction thereof being associated with the positive and negative of the Y-axis, when the operator inputs a touch operation in the upward direction along the Y-axis direction, the arm of the robot 2 turns in the upward direction. When the operator inputs a touch operation in the downward direction along the Y-axis direction, the arm of the robot 2 turns in the downward direction.

Therefore, the operating sensation experienced by the operator and the actual action direction of the robot 2 match, allowing operation that is more intuitive. In the case of the J5 axis and the J6 axis shown in FIG. 12(B), the J5 axis sets the orientation of the J6 axis to be upward or downward. For example, when the J6 axis faces downward, the J6 axis rotates horizontally. Therefore, it is thought that the operating sensation and the action of the robot 2 are similar.

Association between the XY coordinate system and the actions of the robot 2 is not limited to those shown in FIG. 12, and can be set as appropriate.

Third Embodiment

A third embodiment will be described below, with reference to FIG. 13 to FIG. 21. The third embodiment differs from the first embodiment in that the determination area is set when a plurality of operating positions are detected.

Figure 13:
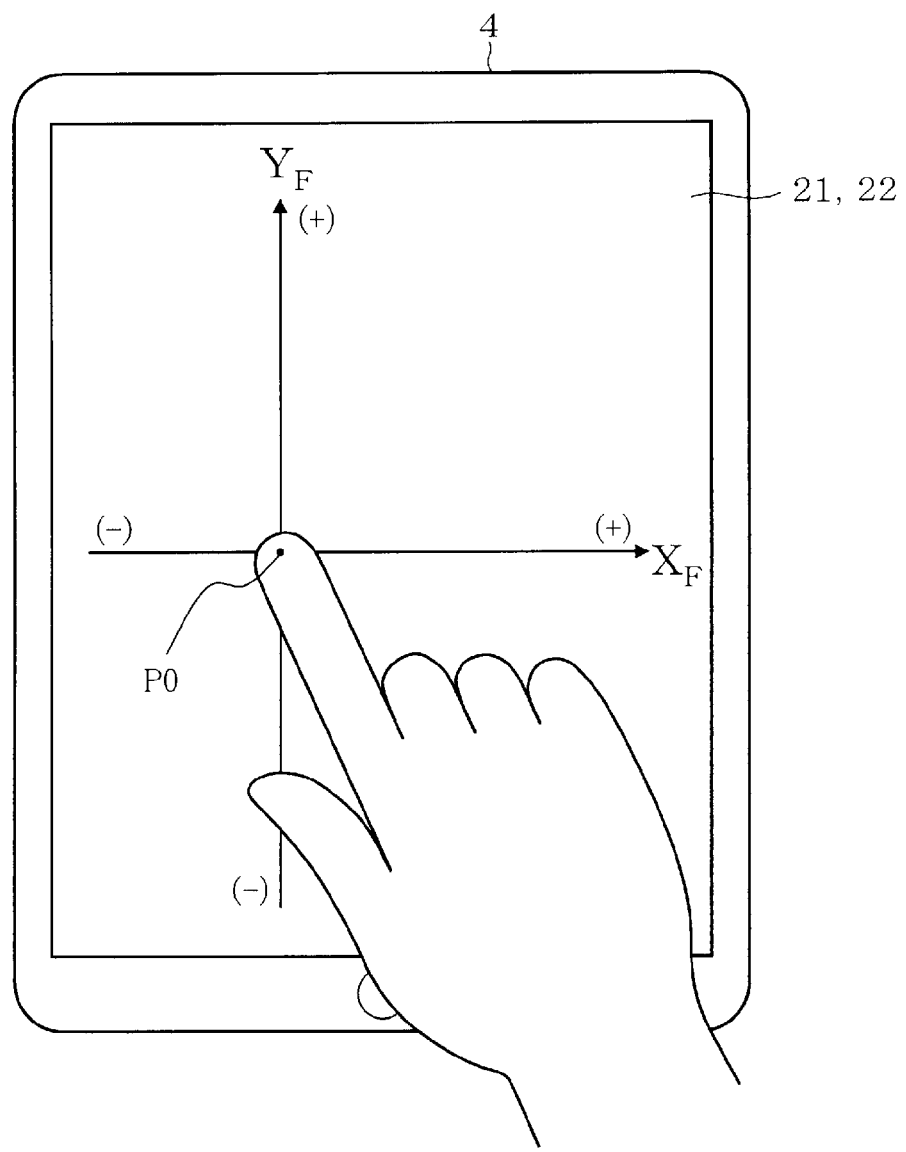
FIG. 13 is a first view pictorially showing a determination area according to a second modification.

The pendant 4 detects respective operating positions for a plurality of touch operations that are inputted on the input area of the touch panel 22, that is, substantially the overall area of the panel plane. When a plurality of operating positions are detected, the pendant 4 sets a determination area such as that shown in FIG. 4(B). Specifically, as shown in FIG. 13, for example, the operator inputs a touch operation with a single index finger. The position touched by the index finger is an operating position (P0). At this time, the pendant 4 does not yet set the determination area.

Figure 14:
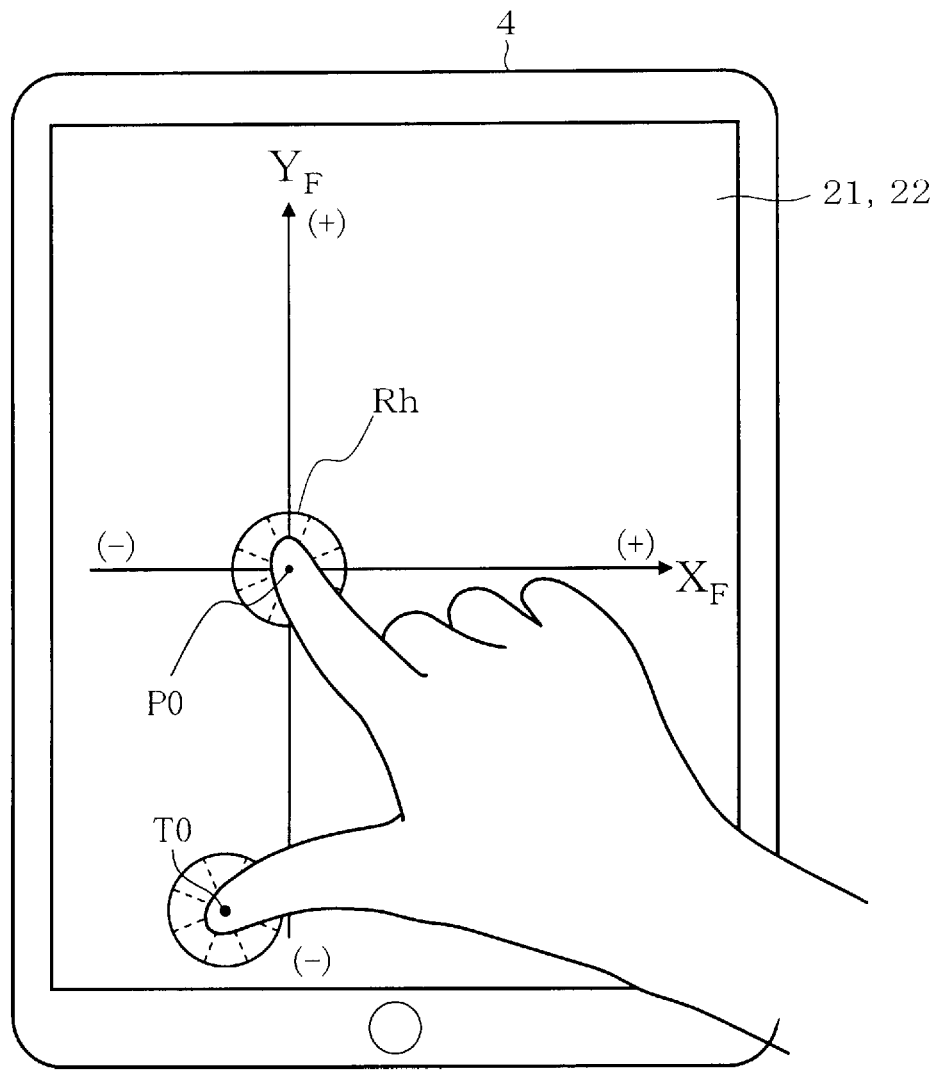
FIG. 14 is a second view pictorially showing the determination area.

Then, as shown in FIG. 14, for example, the operator touches an operating position (T0) at an arbitrary position within the input area, with a thumb. At this time, in a state in which the operating position (P0) corresponding to the index finger is detected, the pendant 4 detects the new operating position (T0). That is, the pendant 4 detects a plurality of operating positions. Therefore, the pendant 4 sets the determination area (Rh) for each of the operating positions. Then, the pendant 4 selects the axis to be operated based on the arrival position of the determination area (Rh), between the two determination areas (Rh), to which a finger arrives first.

Figure 15:
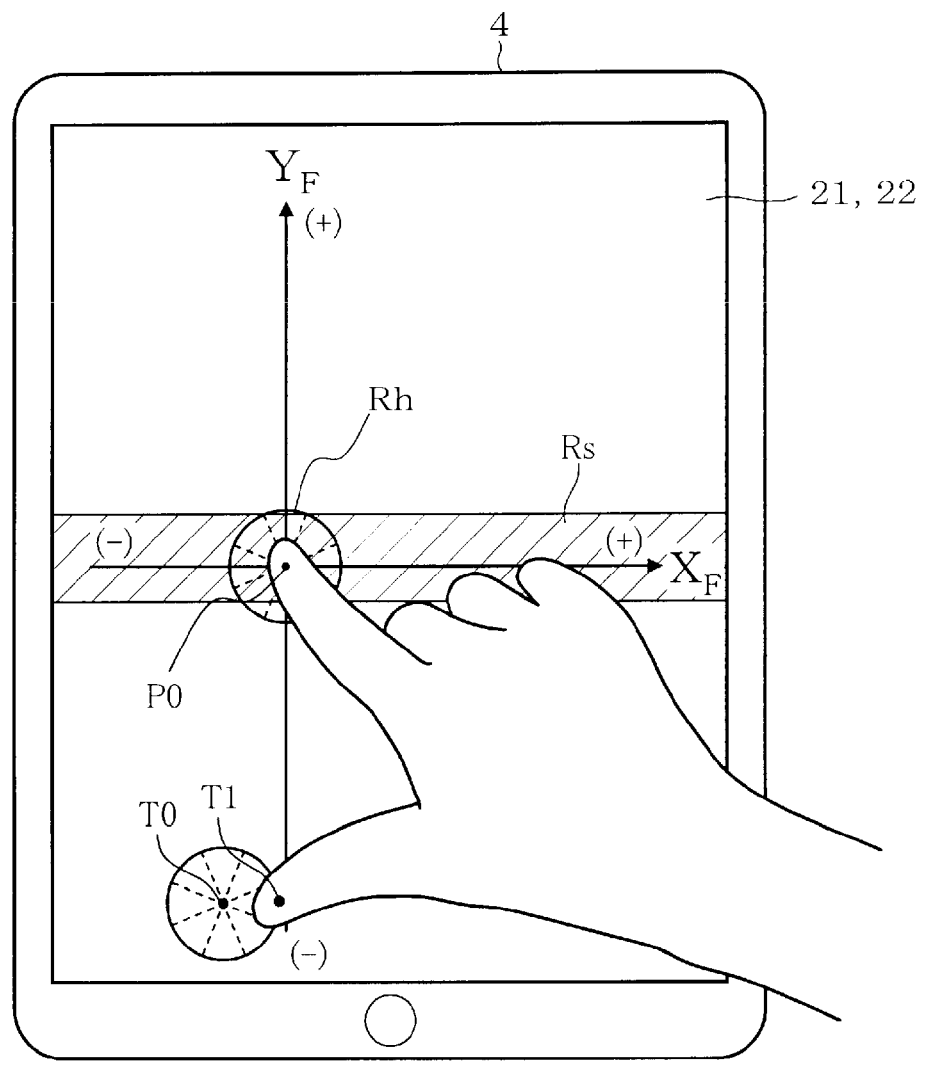
FIG. 15 is a third view pictorially showing the determination area.

For example, when the index finger arrives at the arrival position first in FIG. 14, the axis to be operated is selected as shown in FIG. 6(A) according to the first embodiment. In a similar manner, when the thumb arrives at the arrival position first as shown in FIG. 15, the pendant 4 selects the axis corresponding to the arrival position of the thumb as the axis to be operated. At this time, the pendant 4 sets the operating area (Rs) at the operating position (P0) that is detected first. A reason for this is that it is assumed that, when the new operating position (T0) is detected while the operating position (P0) is being detected, the operating position (P0) is the touch operation performed to operate the axis.

In this case, as a result of a condition being that the operation of the axis is performed by the touch operation corresponding to the operating position (P0), a touch operation for more accurately operating the axis can be determined. In two-axis mode in which two axes are simultaneously operated by a finger being moved in a two-dimensional direction, operation of only a single axis can be performed without the mode being switched. Therefore, usability is also improved. The operating area (Rs) is the same as that according to the first embodiment. The pendant 4 sets the operating area (Rs) along the X+ direction when the arrival position is associated with X+.

When a plurality of operating positions are detected substantially at the same time, such as within a predetermined amount of time that is, for example, 0.5 seconds, the operating area (Rs) may be set for the arrival position at which a finger arrives first. In addition, for example, even when the new operating position (T0) is detected while the operating position (P0) is detected first, the operating area (Rs) may be set at the operating position that arrives at the arrival position first. Alternatively, the operating area (Rs) may be set at both operating positions. As a result, for example, when the axis is selected by the thumb as in FIG. 15, operation of the axis can be performed by the thumb being moved as is.

In this way, the respective operating positions of the plurality of touch operations inputted to the touch panel 22 are detected. When a plurality of operating positions are detected, the determination areas are set. As a result, for example, when a touch operation is performed with the index finger and, during the touch operation, action in a vertical direction is to be accurately performed, the determination area for selecting the axis can be set by the thumb, for example, touching the touch panel 22. In this case, after the plurality of operating positions are detected and the axis is selected, when the operating position by which the axis is selected is no longer detected and another operating position is consecutively detected, the axis may be operated based on subsequent changes in the consecutively detected operating position, that is, the movement of the finger performing a consecutive touch operation. In other words, even when the finger that has selected the axis is removed upon selection of the axis, when another finger performs a consecutive touch operation, the finger performing the consecutive touch operation may be determined to be for operation of the axis.

Therefore, a weakness in that action in an unintended direction is performed and operation becomes difficult when fine adjustment and linear action are made can be overcome, while taking advantage of a strength in that intuitive operation can be performed by touch operation. Work efficiency can be improved by, for example, the time required for a teaching operation being shortened. That is, even should the finger slightly shake, occurrence of an action that goes against the intentions of the operator, such as the axis to be operated being switched, can be suppressed. An action going along with the intentions of the operator can be actualized. In addition, the determination areas are set for each of the plurality of operating positions. Therefore, setting of the axis is possible from any of the operating positions. Usability can be improved.

Here, operation of an axis and selection of an axis are the same in terms of commands issued to the robot 2. Therefore, it can be assumed that some operators may wish to input the commands for the robot 2 with the same finger. In other words, it is assumed that some operators may wish to select the axis with the finger used to operate the axis. Therefore, rather than the determination areas (Rh) being set at the plurality of operating points as shown in FIG. 14, the determination area may be set at the operating position that is detected first, among the plurality of detected operating positions.

Figure 16:
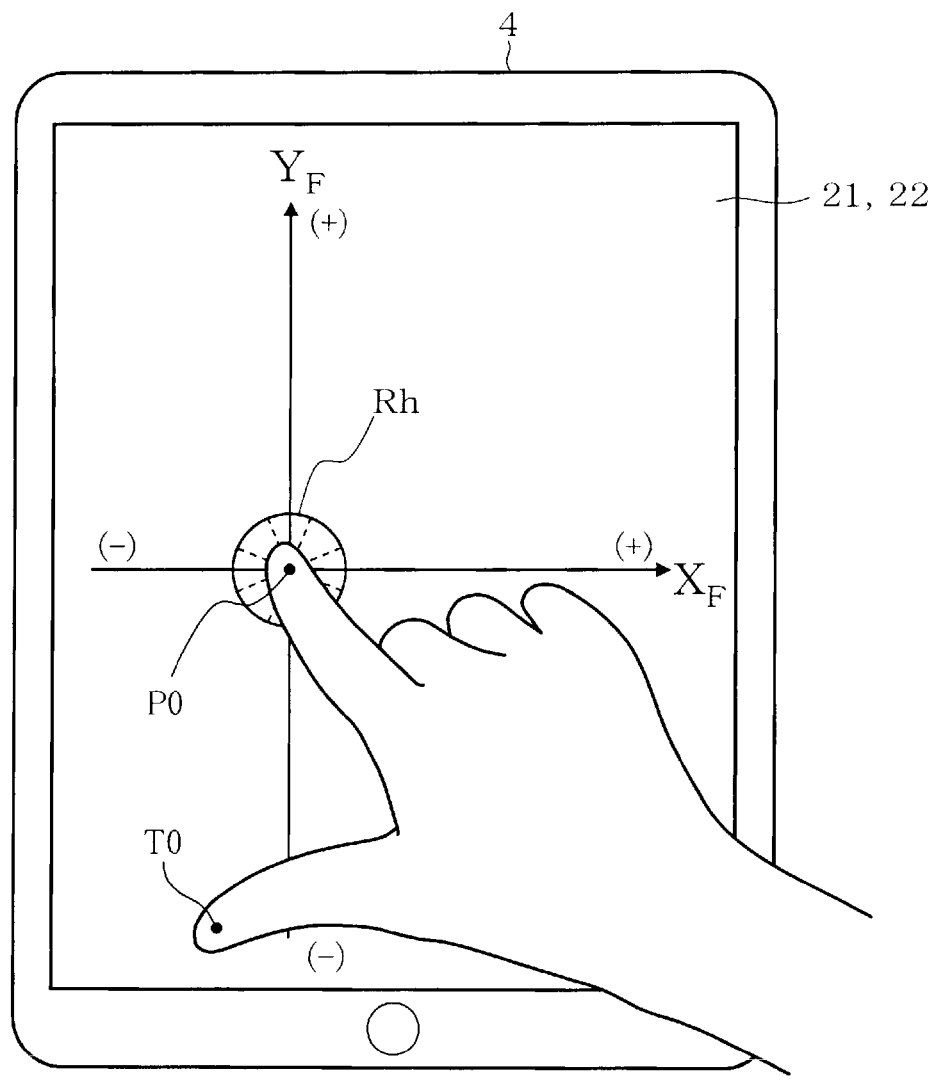
FIG. 16 is a fourth view pictorially showing the determination area.
Figure 17:
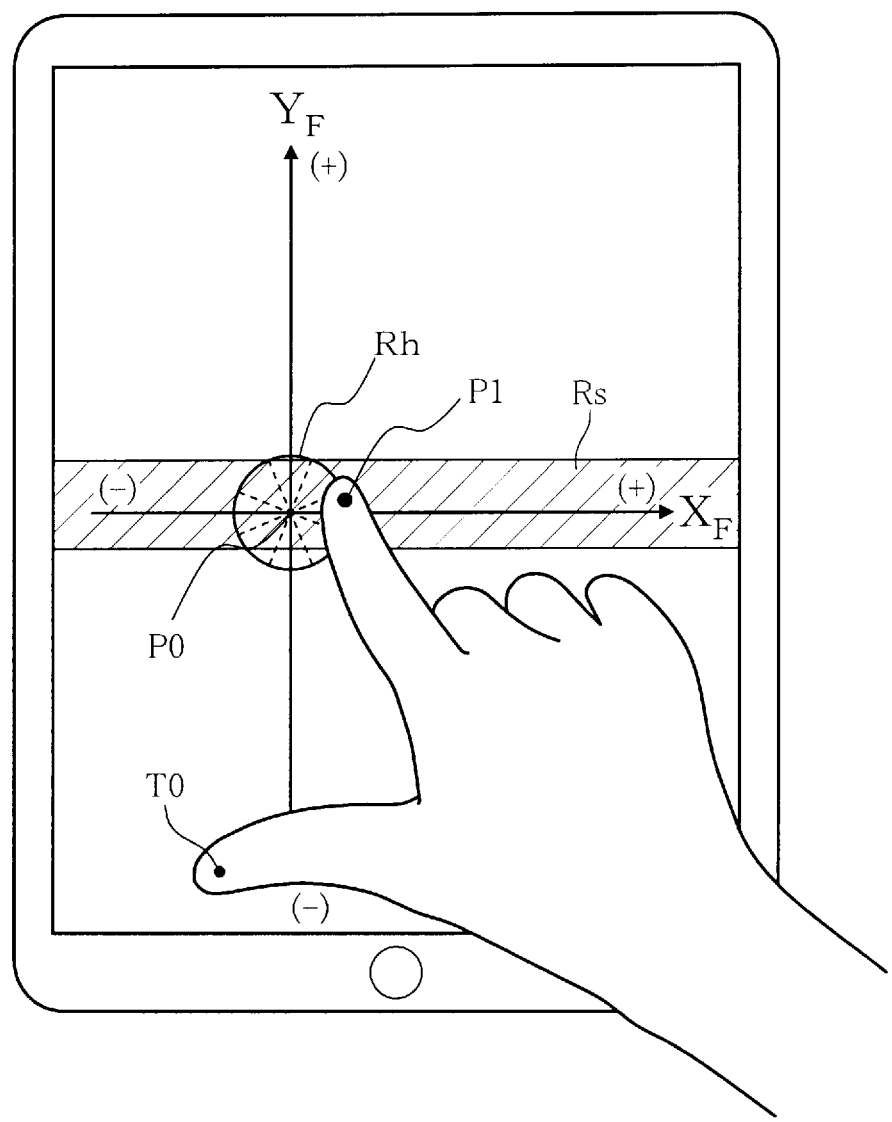
FIG. 17 is a fifth view pictorially showing the determination area.

Specifically, when, in the state in FIG. 13, that is, the state in which the operating position (P0) assumed to be for operating the axis is detected, a new operating position (T0) is detected as shown in FIG. 16, the determination area (Rh) may be set at the operating position (P0) that is detected first. Then, when the finger moves as shown in FIG. 17 and arrives at the operating position (P1) on the determination area (Rh), that is, when the arrival position is identified, the operating area (Rs) is set for the arrival position. As a result, the two commands, that is, the operation of the axis and the selection of the axis, can be performed by the same finger.

At this time, the pendant 4 may fix the axis while the touch operation to the operating position (T0) detected later is being continued. That is, switching of the axis to be operated may be disenabled while a plurality of operating positions are being detected. As a result, whether or not to switch the axis to be operated can be selected by the touch operation to the operating position (T0). When the finger for operating the axis can be determined, fixing of the axis to be operated may be released upon completion of the touch operation by the finger.

Conversely, when only a single axis is to be operated during two-axis mode in which two axes are simultaneously operated, it can be assumed that some operators may wish to avoid shifting the position of the robot 2 when moving the finger performing the operation, and wish to perform operation of the axis and selection of the axis with differing fingers. Therefore, the determination area may be set at the operating position that is detected later, among the plurality of detected operating positions. Specifically, for example, in a state in which the operating position (P0) at which the operator touches to operate the axis is detected, a new operating position (T0) is detected.

Figure 18:
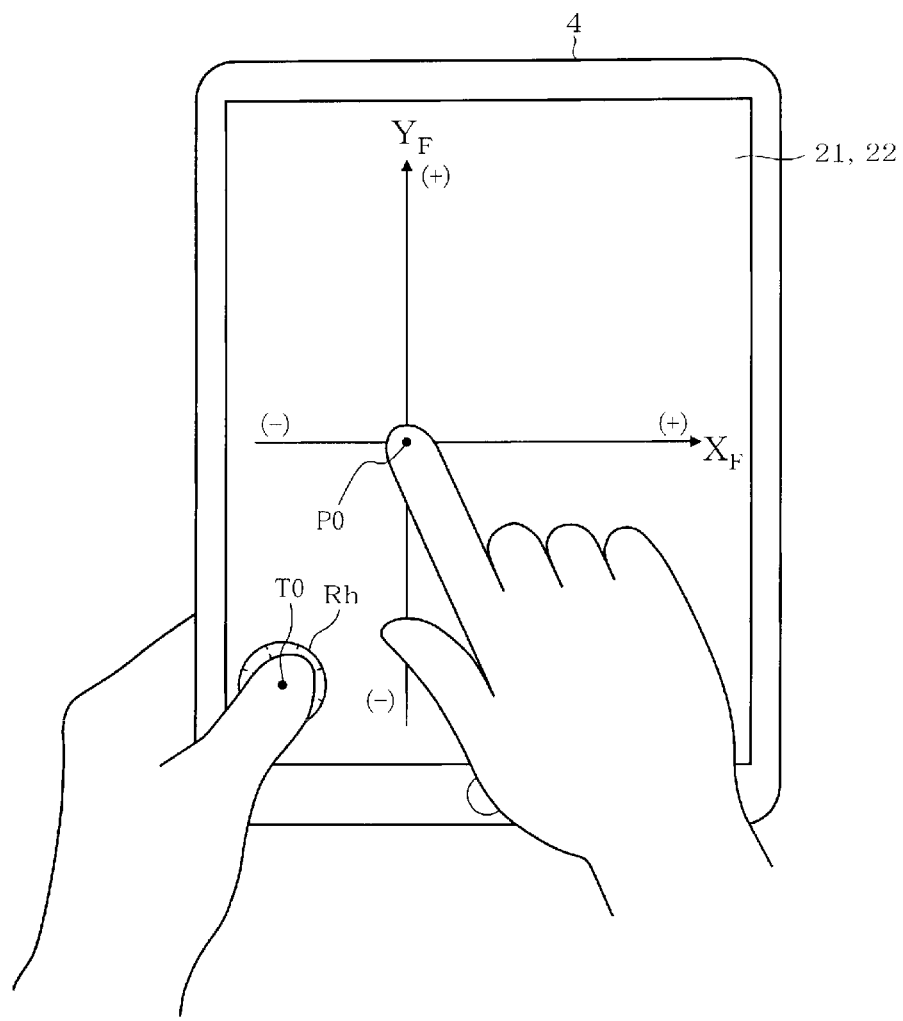
FIG. 18 is a sixth view pictorially showing the determination area.
Figure 19:
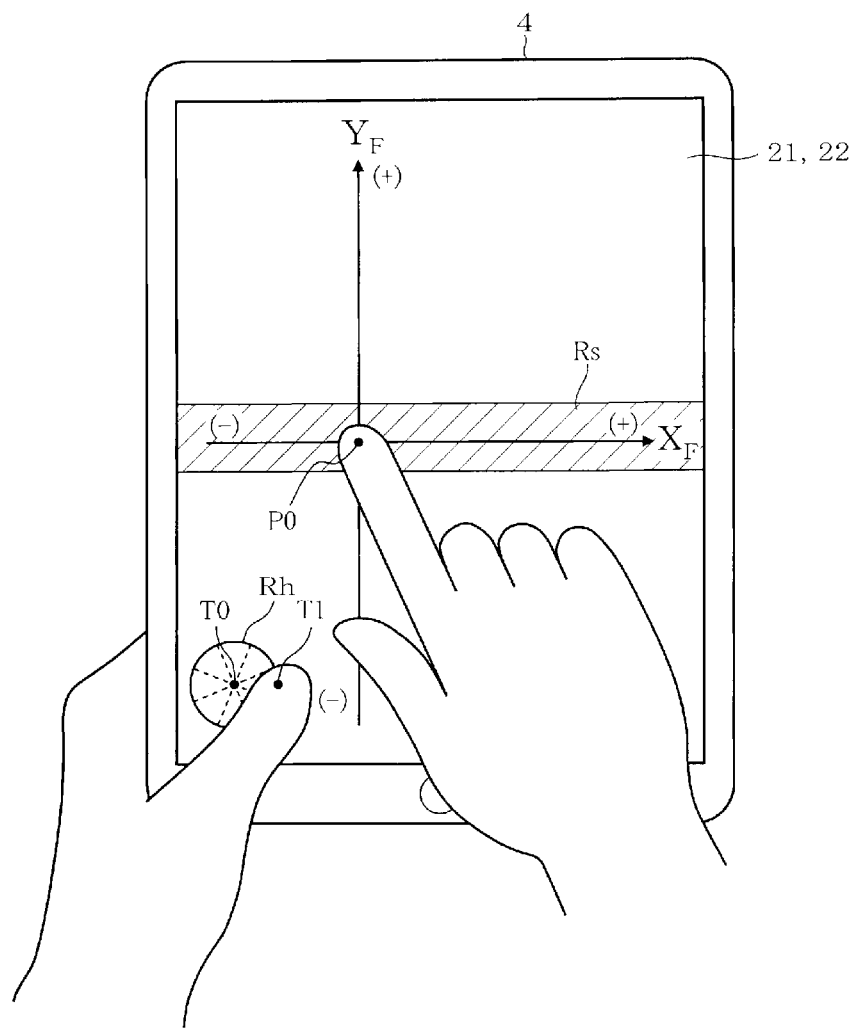
FIG. 19 is a seventh view pictorially showing the determination area.

When the new operating position (T0) is detected, the pendant 4 sets the determination area (Rh) at the operating position (T0) on the side that is detected later, as shown in FIG. 18. Then, when the operator moves the thumb and reaches the operating area (Rh) as shown in FIG. 19, the pendant 4 selects the axis to be selected based on the arrival position. At this time, the pendant 4 may set the operating area (Rs) at the operating position (P0) that is touched for operation of the axis.

In this way, the determination area is set at the operating position (T0) that is detected later, among the plurality of detected operating positions. As a result, the axis can be selected without the finger at the operating position (P0), which is detected first, being moved. Consequently, the desire of an operator who wishes to perform operation of the axis and selection of the axis with differing fingers can be met. Usability can be improved.

Figure 20:
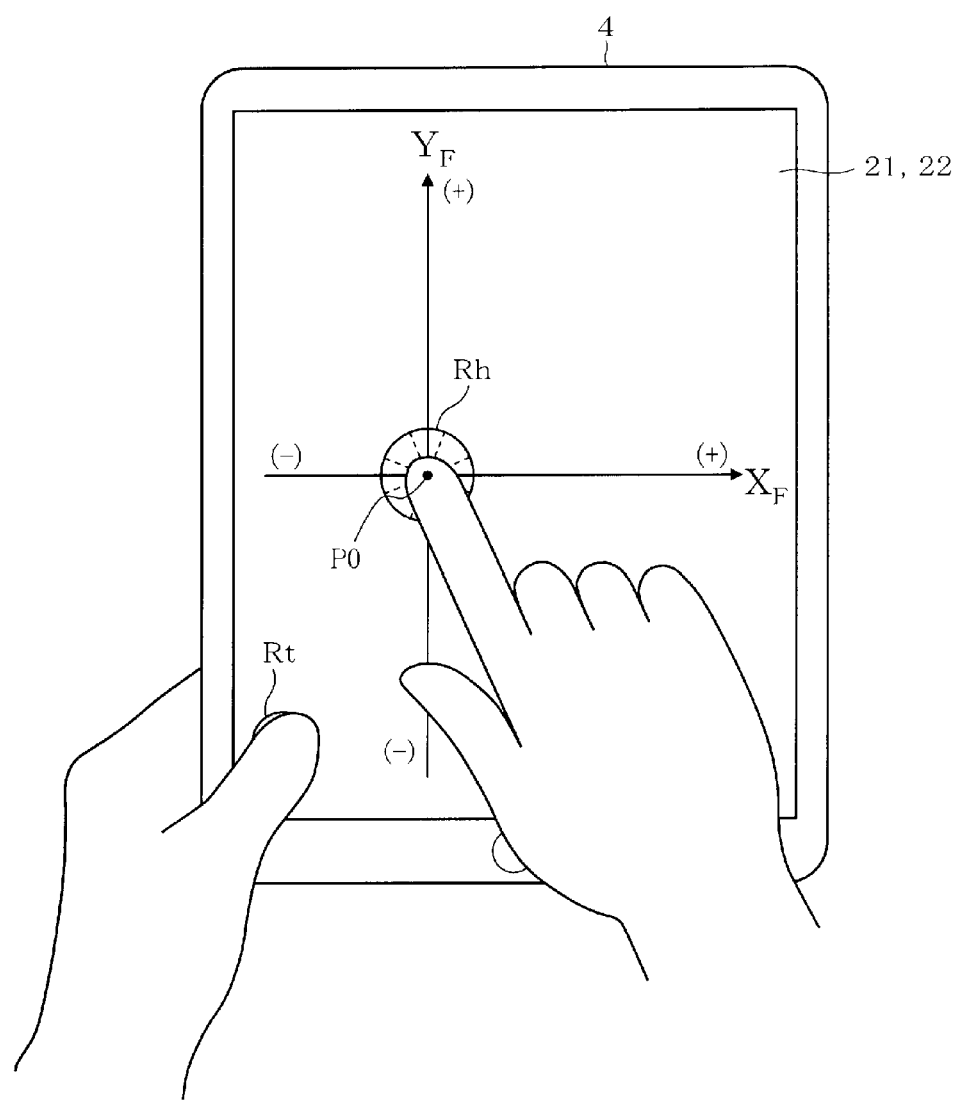
FIG. 20 is a eighth view pictorially showing the determination area.

As shown in FIG. 20, a button area (Rt) for setting the determination area may be set in advance, for example, near the thumb of a left hand that grips the pendant 4. In this case, when a new operating position (P0) is detected after the button area (Rt) is operated, the pendant 4 may set the determination area (Rh) at the operating position (P0). Alternatively, when a touch operation on the button area (Rt) is newly detected while the operating position (P0) is being detected, the pendant 4 may set the determination area (Rh) at the operating position (P0).

In addition, the position and size of the determination area (Rh) shown as an example in FIG. 19 or the position and size of the button area (Rt) shown as an example in FIG. 20 are not limited thereto. For example, according to the present embodiment, an example is given in which the touch operation is inputted by the right hand. However, taking into consideration operators who input the touch operation with the left hand, the determination area (Rh) and the button area (Rt) may be set in a position reachable by the thumb when the pendant is gripped in the right hand. In addition, the operator may select the position in which to set the determination area (Rh) and the button area (Rt).

In any case, the axis to be operated can be easily selected, and shaking of the finger can be nullified by the operating area being set. Therefore, the risk of action in an unintended direction can be reduced without compromising the advantages of using the touch panel 22.

Other Embodiments

The present invention is not limited to the embodiments described above and shown in the drawings. The present invention can be applied to various embodiments without departing from the spirit of the invention. For example, the present invention can be modified or expanded in the following manner.

The operator may be notified of switching of the axis to be operated and switching of the operating mode by the notifying unit 25 through sound, vibrations, or the like. As a result, even when the robot 2 is operated using the touch panel 22 of which the state is difficult to grasp through guesswork, switching of the axis to be operated and switching of the operating mode can be ascertained with certainty. Psychological burden placed on the operator can be reduced.

According to the embodiments, the operating area is set such that the center line (CL) thereof runs run along a selected axis. However, the operating area may be set such that the center line (CL) runs along the operating direction that indicates the direction from the start position to the arrival position. For example, as shown in FIG. 5, when the arrival position (P1) when the $X_F$-axis is selected as the axis to be operated is misaligned with the X-axis, the finger moves farther away from the X-axis as the subsequent movement distance of the finger increases. In this case, the operator most likely believes that the finger is moving straight along the X-axis. Therefore, when the center line of the operating area is set in parallel with the X-axis, there is risk of the finger leaving the operating area and the axis or the operating mode being unintentionally switched, when the operator continues to the move the finger as is. Thus, it is though that, should the center line (CL) be set to run along the operating direction up to this point when the operating area is set, the operating area can be set in a state that follows the intention of the operator.

The sizes of the determination area and the operating area given according to the embodiments can be arbitrarily modified. For example, according to the embodiments, an operating area having a size that is prescribed in advance is set. However, the width (W) of the operating area may be set based on the size (radius r) of the determination area. In this case, for example, the size of the determination area may be reset each time a touch operation is performed, based on the start position. Alternatively, the size of the determination area may be set based on the type of axes of the robot 2 that is associated with the coordinate axes. Alternatively, a plurality of sizes may be registered in advance, and the size of the determination area may be selected when the process shown in FIG. 4 is performed. In addition, when selection of the axis is performed based on the concept of time, as described above, the configuration may be such that the width of the operating area is modified depending on the distance between the start position and the operating position (arrival position) after the elapse of a determination period.

According to the first embodiment, two-axis mode can be selected from the start. However, a configuration is also possible in which only single-axis mode is set. In single-axis mode, either of the two axes (such as the $X_F$ axis and the $Y_F$ axis) associated with the coordinate axes is operated alone. When the operating position leaves the operating area, the other axis may be operated in single-axis mode. The configuration may be that in which only the axis to be operated is switched, without the operating mode (single-axis mode) itself being switched. According to the first embodiment, the axis is switched when the operating position leaves the operating area. However, the action may be stopped without the axis being switched, when the operating position leaves the operating area. As a result, the risk of the axis being unintentionally switched can be reduced. The subject to be operated by the robot operating apparatus is not limited to the six-axis, vertical, articulated-type robot given as an example according to the embodiments. The robot operating apparatus may operate a four-axis, horizontal, articulated-type robot. That is, the present invention can be applied to various robots prescribed by Japanese Industrial Standards (JIS). In terms of shape classification, the robots include vertical articulated-type robots, horizontal articulated-type robots, Cartesian coordinate robots, and parallel link robots.

The robot operating apparatus according to the embodiments is configured by the robot-dedicated pendant 4. However, the robot operating apparatus is not limited thereto. An application for robot control may be loaded onto a general-purpose, tablet-type terminal (a so-called tablet personal computer [PC]), a smartphone (a multifunctional mobile phone), or the like, thereby configuring the robot operating apparatus. In such configurations as well, functions identical to those of the above-described pendant 4 can be actualized. Similar effects can be achieved. The axes of the robot 2 associated with the coordinate system may be visibly displayed in the display unit 21.

What is claimed is:

1. An apparatus for operating a robot, the apparatus comprising:
   a touch panel to which a touch operation by a user is inputted;
   an operating position detecting unit that detects an operating position when the touch operation is inputted to the touch panel;
   a coordinate system setting unit that sets, on a panel plane of the touch panel, a coordinate system in which a start position that is an operating position at which the touch operation is started serves as a point of origin, and with which axes of a robot to be operated are associated in advance;
   a determination area setting unit that sets a determination area having a size that is set in advance;
   an axis selecting unit that selects the axis to be operated, among the axes of the robot associated with the coordinate axes, based on an arrival position that is an operating position at which the determination area is reached; and
   an operating area setting unit that sets an operating area having a width that is set in advance with the arrival position as a center.

2. An apparatus for operating a robot, the apparatus comprising:
   a touch panel to which a touch operation by a user is inputted;
   an operating position detecting unit that detects an operating position when the touch operation is inputted to the touch panel;
   a coordinate system setting unit that sets, on a panel plane of the touch panel, a coordinate system in which a start position that is an operating position at which the touch operation is started serves as a point of origin, and with which axes of a robot to be operated are associated in advance;
   a determination area setting unit that sets a determination area having a size that is set in advance;
   an axis selecting unit that selects the axis to be operated, among the axes of the robot associated with the coordinate system, based on a positional relationship between an arrival position that is an operating position when a determination period that is prescribed in advance elapses from the start of the touch operation; and
   an operating area setting unit that sets an operating area having a width that is set in advance with the arrival position as a center.

3. The apparatus according to claim 1, comprising:
   an axis switching unit that switches the axis to be operated based on whether or not the operating position is within the operating area, wherein
   the coordinate system setting unit sets a coordinate system that has two coordinate axes that are orthogonal to each other, and in which the axes of the robot are associated in advance with the coordinate axis together with positive and negative action directions, and two axes of the robot associated with the coordinate axes are associated with predetermined areas of a first quadrant, a second quadrant, a third quadrant, and a fourth quadrant together with the action directions thereof,
   the axis selecting unit, based on whether the axis selected as the axis to be operated is a single axis or two axes, sets single-axis mode as an operating mode for operating the robot when a single axis is selected, the single-axis mode being that in which the single axis is operated alone, and sets two-axis mode as the operating mode when two axes are selected, the two-axis mode being that in which the two axes are simultaneously operated,
   the operating area setting unit sets the operating area as an area over which the operating mode set by the axis setting unit is continued, and
   the axis switching unit switches the operating mode from single-axis mode to two-axis mode or from two-axis mode to single-axis mode when the operating position leaves the operating area.

4. The apparatus according to claim 3, wherein:
   the operating area setting unit sets a new operating area of which the center is a departure position that is an operating position at which the operating position leaves the operating area, when the axis switching unit switches the axis to be operated.

5. The apparatus according to any one of claim 1, wherein:
   the operating area setting unit modifies the width of the operating area based on a distance from the arrival position.

6. The apparatus according to any one of claim 1, wherein:
   the operating area setting unit sets the operating area such that a center line of the operating area runs along an operating direction that indicates a direction from the start position to the arrival position.

7. The apparatus according to any one of claim 1, wherein:
   the operating area setting unit sets a new operating area of which the center is a departure position that is an operating position at which the operating position leaves the operating area, when the axis switching unit switches the axis to be operated.

8. The apparatus according to claim 1, wherein:
   the operating area setting unit modifies the width of the operating area based on a distance from the start position to the arrival position.

9. The apparatus according to claim 1, wherein:
   the operating position detecting unit detects respective operating positions of a plurality of touch operations inputted to the touch panel; and
   the determination area setting unit sets the determination area when the operating position detecting unit detects the plurality of operating positions.

10. The apparatus according to claim 9, wherein:
the determination area setting unit sets the determination area for each of the plurality of detected operating positions.

11. The apparatus according to claim 10, wherein:
the axis selecting unit selects the axis to be operated based on the arrival position in the determination area on a side at which the operating position arrives at the determination area first, when the plurality of determination areas are set.

12. The apparatus according to claim 9, wherein:
the determination area setting unit sets the determination area at the operating position detected first, among the plurality of detected operating positions.

13. The apparatus according to claim 9, wherein:
the determination area setting unit sets the determination area at the operating position that is detected later, among the plurality of detected operating positions.

14. A non-transitory computer readable medium comprising instructions for operating a robot, the instructions comprising;
detecting an operating position at which a touch operation is inputted to a touch panel;
setting, on a panel plane of the touch panel, a coordinate system in which a start position that is an operating position at which the touch operation is started serves as a point of origin, and with which axes of a robot to be operated are associated in advance;
setting a determination area having a size that is set in advance, in a periphery of the start position;
selecting the axis to be operated, among the axes of the robot associated with the coordinate axes, based on a positional relationship between the start position and an arrival position that is an operating position at which the determination area is reached;
setting an operating area having a width that is set in advance with the arrival position as a center; and
switching the axis to be operated based on whether or not the operating position is within the operating area.

15. A non-transitory computer readable medium comprising instructions for operating a robot, the instructions comprising;
detecting an operating position at which a touch operation is inputted to a touch panel;
setting, on a panel plane of the touch panel, a coordinate system in which a start position that is an operating position at which the touch operation is started serves as a point of origin, and with which axes of a robot to be operated are associated in advance;
selecting the axis to be operated, among the axes of the robot associated with the coordinate axes, based on a positional relationship with an arrival position that is an operating position when a determination period that is prescribed in advance elapses from the start of the touch operation;
setting an operating area having a width that is set in advance with the arrival position as a center; and
switching the axis to be operated based on whether or not the operating position is within the operating area.

16. The apparatus according to claim 2, comprising:
an axis switching unit that switches the axis to be operated based on whether or not the operating position is within the operating area, wherein
the coordinate system setting unit sets a coordinate system that has two coordinate axes that are orthogonal to each other, and in which the axes of the robot are associated in advance with the coordinate axis together with positive and negative action directions, and two axes of the robot associated with the coordinate axes are associated with predetermined areas of a first quadrant, a second quadrant, a third quadrant, and a fourth quadrant together with the action directions thereof,
the axis selecting unit, based on whether the axis selected as the axis to be operated is a single axis or two axes, sets single-axis mode as an operating mode for operating the robot when a single axis is selected, the single-axis mode being that in which the single axis is operated alone, and sets two-axis mode as the operating mode when two axes are selected, the two-axis mode being that in which the two axes are simultaneously operated,
the operating area setting unit sets the operating area as an area over which the operating mode set by the axis setting unit is continued, and
the axis switching unit switches the operating mode from single-axis mode to two-axis mode or from two-axis mode to single-axis mode when the operating position leaves the operating area.

17. The apparatus according to claim 16, wherein:
the operating area setting unit sets a new operating area of which the center is a departure position that is an operating position at which the operating position leaves the operating area, when the axis switching unit switches the axis to be operated.

18. The apparatus according to claim 2, wherein:
the operating area setting unit modifies the width of the operating area based on a distance from the arrival position.

19. The apparatus according to claim 2, wherein:
the operating area setting unit sets the operating area such that a center line of the operating area runs along an operating direction that indicates a direction from the start position to the arrival position.

20. The apparatus according to claim 2, wherein:
the operating area setting unit sets a new operating area of which the center is a departure position that is an operating position at which the operating position leaves the operating area, when the axis switching unit switches the axis to be operated.

* * * * *